US008596355B2

(12) United States Patent
Kaminsky et al.

(10) Patent No.: US 8,596,355 B2
(45) Date of Patent: Dec. 3, 2013

(54) OPTIMIZED WELL SPACING FOR IN SITU SHALE OIL DEVELOPMENT

(75) Inventors: Robert D Kaminsky, Houston, TX (US); William A Symington, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 335 days.

(21) Appl. No.: 12/965,502

(22) Filed: Dec. 10, 2010

(65) Prior Publication Data

US 2011/0132600 A1    Jun. 9, 2011

Related U.S. Application Data

(63) Continuation of application No. 11/973,746, filed on Oct. 10, 2007, now abandoned, and a continuation-in-part of application No. 12/630,636, filed on Dec. 3, 2009, now abandoned, which is a continuation of application No. 12/011,456, filed on Jan. 25, 2008, now Pat. No. 7,631,691, which is a continuation-in-part of application No. 10/558,068, filed as application No. PCT/US2004/011508 on Apr. 14, 2004, now Pat. No. 7,331,385.

(60) Provisional application No. 60/851,541, filed on Oct. 13, 2006, provisional application No. 60/482,135, filed on Jun. 24, 2003, provisional application No. 60/511,994, filed on Oct. 16, 2003.

(51) Int. Cl.
*E21B 43/24* (2006.01)
*E21B 47/024* (2006.01)
*E21B 47/09* (2012.01)

(52) U.S. Cl.
USPC ........................................ 166/255.2; 166/302

(58) Field of Classification Search
None
See application file for complete search history.

(56) References Cited

U.S. PATENT DOCUMENTS 363,419 A    5/1887    Poetsch
895,612 A    8/1908    Baker (Continued)

FOREIGN PATENT DOCUMENTS

CA         994694    8/1976
CA        1288043    8/1991

(Continued)

OTHER PUBLICATIONS

Ali, A.H.A, et al, (2003) "Watching Rocks Change—Mechanical Earth Modeling", *Oilfield Review*, pp. 22-39.

(Continued)

*Primary Examiner* — Zakiya W Bates
(74) *Attorney, Agent, or Firm* — ExxonMobil Upstream Research Company—Law Department

(57) ABSTRACT

A method for spacing heater wells for an in situ conversion process includes the steps of determining a direction along which thermal energy will travel most efficiently through a subsurface formation, and completing a plurality of heater wells in the subsurface formation, with the heater wells being spaced farther apart in the determined direction than in a direction transverse to the determined direction. In one aspect, the step of determining a direction along which thermal energy will travel most efficiently is performed based upon a review of geological data pertaining to the subsurface formation. The geological data may comprise the direction of least horizontal principal stress in the subsurface formation. Alternatively, the geological data may comprise the direction of bedding in the subsurface formation, the tilt of the subsurface formation relative to the surface topography, the organic carbon content of the kerogen, the initial formation permeability, and other factors.

33 Claims, 10 Drawing Sheets

(56) References Cited

U.S. PATENT DOCUMENTS

| | | |
|---|---|---|
| 1,342,780 A | 6/1920 | Vedder |
| 1,422,204 A | 7/1922 | Hoover et al. |
| 1,666,488 A | 4/1928 | Crawshaw |
| 1,701,884 A | 2/1929 | Hogle |
| 1,872,906 A | 8/1932 | Doherty |
| 2,033,560 A | 3/1936 | Wells |
| 2,033,561 A | 3/1936 | Wells |
| 2,534,737 A | 12/1950 | Rose |
| 2,584,605 A | 2/1952 | Merriam et al. |
| 2,634,961 A | 4/1953 | Ljungstrom |
| 2,732,195 A | 1/1956 | Ljungstrom |
| 2,777,679 A | 1/1957 | Ljungstrom |
| 2,780,450 A | 2/1957 | Ljungstrom |
| 2,795,279 A | 6/1957 | Sarapuu |
| 2,812,160 A | 11/1957 | West et al. |
| 2,813,583 A | 11/1957 | Marx et al. |
| 2,847,071 A | 8/1958 | De Priester |
| 2,887,160 A | 5/1959 | De Priester |
| 2,895,555 A | 7/1959 | De Priester |
| 2,923,535 A | 2/1960 | Ljungstrom |
| 2,944,803 A | 7/1960 | Hanson |
| 2,952,450 A | 9/1960 | Purre |
| 2,974,937 A | 3/1961 | Kiel |
| 3,004,601 A | 10/1961 | Bodine |
| 3,013,609 A | 12/1961 | Brink |
| 3,095,031 A | 6/1963 | Eurenius et al. |
| 3,106,244 A | 10/1963 | Parker |
| 3,109,482 A | 11/1963 | O'Brien |
| 3,127,936 A | 4/1964 | Eurenius |
| 3,137,347 A | 6/1964 | Parker |
| 3,149,672 A | 9/1964 | Orkiszewski et al. |
| 3,170,815 A | 2/1965 | White |
| 3,180,411 A | 4/1965 | Parker |
| 3,183,675 A | 5/1965 | Schroeder |
| 3,183,971 A | 5/1965 | McEver et al. |
| 3,194,315 A | 7/1965 | Rogers |
| 3,205,942 A | 9/1965 | Sandberg |
| 3,225,829 A | 12/1965 | Chown et al. |
| 3,228,869 A | 1/1966 | Irish |
| 3,241,611 A | 3/1966 | Dougan |
| 3,241,615 A | 3/1966 | Brandt et al. |
| 3,254,721 A | 6/1966 | Smith et al. |
| 3,256,935 A | 6/1966 | Nabor et al. |
| 3,263,211 A | 7/1966 | Heidman |
| 3,267,680 A | 8/1966 | Schlumberger |
| 3,271,962 A | 9/1966 | Dahms et al. |
| 3,284,281 A | 11/1966 | Thomas |
| 3,285,335 A | 11/1966 | Reistle, Jr. |
| 3,288,648 A | 11/1966 | Jones |
| 3,294,167 A | 12/1966 | Vogel |
| 3,295,328 A | 1/1967 | Bishop |
| 3,323,840 A | 6/1967 | Mason et al. |
| 3,358,756 A | 12/1967 | Vogel |
| 3,372,550 A | 3/1968 | Schroeder |
| 3,376,403 A | 4/1968 | Mircea |
| 3,382,922 A | 5/1968 | Needham |
| 3,400,762 A | 9/1968 | Peacock et al. |
| 3,436,919 A | 4/1969 | Shock et al. |
| 3,439,744 A | 4/1969 | Bradley |
| 3,468,376 A | 9/1969 | Slusser et al. |
| 3,500,913 A | 3/1970 | Nordgren et al. |
| 3,501,201 A | 3/1970 | Closmann et al. |
| 3,502,372 A | 3/1970 | Prats |
| 3,513,914 A | 5/1970 | Vogel |
| 3,515,213 A | 6/1970 | Prats |
| 3,516,495 A | 6/1970 | Patton |
| 3,521,709 A | 7/1970 | Needham |
| 3,528,252 A | 9/1970 | Gail |
| 3,528,501 A | 9/1970 | Parker |
| 3,547,193 A | 12/1970 | Gill |
| 3,559,737 A | 2/1971 | Ralstin |
| 3,572,838 A | 3/1971 | Templeton |
| 3,599,714 A | 8/1971 | Messman |
| 3,602,310 A | 8/1971 | Halbert |
| 3,613,785 A | 10/1971 | Closmann et al. |
| 3,620,300 A | 11/1971 | Crowson |
| 3,642,066 A | 2/1972 | Gill |
| 3,661,423 A | 5/1972 | Garrett |
| 3,692,111 A | 9/1972 | Breithaupt et al. |
| 3,695,354 A | 10/1972 | Dilgren et al. |
| 3,700,280 A | 10/1972 | Papadopoulos et al. |
| 3,724,225 A | 4/1973 | Mancini et al. |
| 3,729,965 A | 5/1973 | Gartner |
| 3,730,270 A | 5/1973 | Allred |
| 3,739,851 A | 6/1973 | Beard |
| 3,741,306 A | 6/1973 | Papadopoulos |
| 3,759,328 A | 9/1973 | Ueber et al. |
| 3,759,329 A | 9/1973 | Ross |
| 3,759,574 A | 9/1973 | Beard |
| 3,779,601 A | 12/1973 | Beard |
| 3,880,238 A | 4/1975 | Tham et al. |
| 3,882,937 A | 5/1975 | Robinson |
| 3,882,941 A | 5/1975 | Pelofsky |
| 3,888,307 A | 6/1975 | Closmann |
| 3,924,680 A | 12/1975 | Terry |
| 3,943,722 A | 3/1976 | Ross |
| 3,950,029 A | 4/1976 | Timmins |
| 3,958,636 A | 5/1976 | Perkins |
| 3,967,853 A | 7/1976 | Closmann et al. |
| 3,978,920 A | 9/1976 | Badyopadhyay |
| 3,999,607 A | 12/1976 | Pennington et al. |
| 4,003,432 A | 1/1977 | Paull et al. |
| 4,005,750 A | 2/1977 | Shuck |
| 4,007,786 A | 2/1977 | Schlinger |
| 4,008,762 A | 2/1977 | Fisher et al. |
| 4,008,769 A | 2/1977 | Chang |
| 4,014,575 A | 3/1977 | French et al. |
| 4,030,549 A | 6/1977 | Bouck |
| 4,037,655 A | 7/1977 | Carpenter |
| 4,043,393 A | 8/1977 | Fisher et al. |
| 4,047,760 A | 9/1977 | Ridley |
| 4,057,510 A | 11/1977 | Crouch et al. |
| 4,065,183 A | 12/1977 | Hill et al. |
| 4,067,390 A | 1/1978 | Camacho et al. |
| 4,069,868 A | 1/1978 | Terry |
| 4,071,278 A | 1/1978 | Carpenter et al. |
| 4,093,025 A | 6/1978 | Terry |
| 4,096,034 A | 6/1978 | Anthony |
| 4,125,159 A | 11/1978 | Vann |
| 4,140,180 A | 2/1979 | Bridges et al. |
| 4,149,595 A | 4/1979 | Cha |
| 4,160,479 A | 7/1979 | Richardson et al. |
| 4,163,475 A | 8/1979 | Cha et al. |
| 4,167,291 A | 9/1979 | Ridley |
| 4,169,506 A | 10/1979 | Berry |
| 4,185,693 A | 1/1980 | Crumb et al. |
| 4,186,801 A | 2/1980 | Madgavkar et al. |
| 4,202,168 A | 5/1980 | Acheson et al. |
| 4,239,283 A | 12/1980 | Ridley |
| 4,246,966 A | 1/1981 | Stoddard et al. |
| 4,250,230 A | 2/1981 | Terry |
| 4,265,310 A | 5/1981 | Britton et al. |
| 4,271,905 A | 6/1981 | Redford et al. |
| 4,272,127 A | 6/1981 | Hutchins |
| 4,285,401 A | 8/1981 | Erickson |
| 4,318,723 A | 3/1982 | Holmes et al. |
| 4,319,635 A | 3/1982 | Jones |
| 4,320,801 A | 3/1982 | Rowland et al. |
| 4,324,291 A | 4/1982 | Wong et al. |
| 4,340,934 A | 7/1982 | Segesman |
| 4,344,485 A | 8/1982 | Butler |
| 4,358,222 A | 11/1982 | Landau |
| 4,362,213 A | 12/1982 | Tabor |
| 4,368,921 A | 1/1983 | Hutchins |
| 4,369,842 A | 1/1983 | Cha |
| 4,372,615 A | 2/1983 | Ricketts |
| 4,375,302 A | 3/1983 | Kalmar |
| 4,384,614 A | 5/1983 | Justheim |
| 4,397,502 A | 8/1983 | Hines |
| 4,401,162 A | 8/1983 | Osborne |
| 4,412,585 A | 11/1983 | Bouck |
| 4,417,449 A | 11/1983 | Hegarty et al. |
| 4,468,376 A | 8/1984 | Suggitt |
| 4,472,935 A | 9/1984 | Acheson et al. |

(56) References Cited

U.S. PATENT DOCUMENTS

| | | |
|---|---|---|
| 4,473,114 A | 9/1984 | Bell et al. |
| 4,474,238 A | 10/1984 | Gentry et al. |
| 4,483,398 A | 11/1984 | Peters et al. |
| 4,485,869 A | 12/1984 | Sresty et al. |
| 4,487,257 A | 12/1984 | Dauphine |
| 4,487,260 A | 12/1984 | Pittman et al. |
| 4,495,056 A | 1/1985 | Venardos et al. |
| 4,511,382 A | 4/1985 | Valencia et al. |
| 4,532,991 A | 8/1985 | Hoekstra et al. |
| 4,533,372 A | 8/1985 | Valencia et al. |
| 4,537,067 A | 8/1985 | Sharp et al. |
| 4,545,435 A | 10/1985 | Bridges et al. |
| 4,546,829 A | 10/1985 | Martin et al. |
| 4,550,779 A | 11/1985 | Zakiewicz |
| 4,552,214 A | 11/1985 | Forgac et al. |
| 4,567,945 A | 2/1986 | Segalman |
| 4,585,063 A | 4/1986 | Venardos et al. |
| 4,589,491 A | 5/1986 | Perkins |
| 4,589,973 A | 5/1986 | Minden |
| 4,602,144 A | 7/1986 | Vogel |
| 4,607,488 A | 8/1986 | Karinthi et al. |
| 4,626,665 A | 12/1986 | Fort |
| 4,633,948 A | 1/1987 | Closmann |
| 4,634,315 A | 1/1987 | Owen et al. |
| 4,637,464 A | 1/1987 | Forgac et al. |
| 4,640,352 A | 2/1987 | Vanmeurs et al. |
| 4,671,863 A | 6/1987 | Tejeda |
| 4,694,907 A | 9/1987 | Stahl et al. |
| 4,704,514 A | 11/1987 | Van Egmond et al. |
| 4,705,108 A | 11/1987 | Little et al. |
| 4,706,751 A | 11/1987 | Gonduin |
| 4,730,671 A | 3/1988 | Perkins |
| 4,737,267 A | 4/1988 | Pao et al. |
| 4,747,642 A | 5/1988 | Gash et al. |
| 4,754,808 A | 7/1988 | Harmon et al. |
| 4,776,638 A | 10/1988 | Hahn |
| 4,779,680 A | 10/1988 | Sydansk |
| 4,815,790 A | 3/1989 | Rosar et al. |
| 4,817,711 A | 4/1989 | Jeambey |
| 4,828,031 A | 5/1989 | Davis |
| 4,860,544 A | 8/1989 | Krieg et al. |
| 4,886,118 A | 12/1989 | Van Meurs et al. |
| 4,923,493 A | 5/1990 | Valencia et al. |
| 4,926,941 A | 5/1990 | Glandt et al. |
| 4,928,765 A | 5/1990 | Nielson |
| 4,929,341 A | 5/1990 | Thirumalachar et al. |
| 4,974,425 A | 12/1990 | Krieg et al. |
| 5,016,709 A | 5/1991 | Combe et al. |
| 5,036,918 A | 8/1991 | Jennings et al. |
| 5,050,386 A | 9/1991 | Krieg et al. |
| 5,055,030 A | 10/1991 | Schirmer |
| 5,055,180 A | 10/1991 | Klaila |
| 5,082,055 A | 1/1992 | Hemsath |
| 5,085,276 A | 2/1992 | Rivas et al. |
| 5,117,908 A | 6/1992 | Hofmann |
| 5,120,338 A | 6/1992 | Potts, Jr. et al. |
| 5,217,076 A | 6/1993 | Masek |
| 5,236,039 A | 8/1993 | Edelstein |
| 5,255,742 A | 10/1993 | Mikus |
| 5,275,063 A | 1/1994 | Steiger et al. |
| 5,297,626 A | 3/1994 | Vinegar et al. |
| 5,305,829 A | 4/1994 | Kumar |
| 5,372,708 A | 12/1994 | Gewertz |
| 5,377,756 A | 1/1995 | Northrop et al. |
| 5,392,854 A | 2/1995 | Vinegar et al. |
| 5,411,089 A | 5/1995 | Vinegar et al. |
| 5,416,257 A | 5/1995 | Peters |
| 5,620,049 A | 4/1997 | Gipson et al. |
| 5,621,844 A | 4/1997 | Bridges |
| 5,661,977 A | 9/1997 | Shnell |
| 5,730,550 A | 3/1998 | Andersland et al. |
| 5,838,634 A | 11/1998 | Jones et al. |
| 5,844,799 A | 12/1998 | Joseph et al. |
| 5,868,202 A | 2/1999 | Hsu |
| 5,899,269 A | 5/1999 | Wellington et al. |
| 5,905,657 A | 5/1999 | Celniker |
| 5,907,662 A | 5/1999 | Buettner |
| 5,956,971 A | 9/1999 | Cole et al. |
| 6,015,015 A | 1/2000 | Luft et al. |
| 6,016,867 A | 1/2000 | Gregoli et al. |
| 6,023,554 A | 2/2000 | Vinegar et al. |
| 6,055,803 A | 5/2000 | Mastronarde et al. |
| 6,056,057 A | 5/2000 | Vinegar et al. |
| 6,079,499 A | 6/2000 | Mikus et al. |
| 6,148,911 A | 11/2000 | Gipson et al. |
| 6,158,517 A | 12/2000 | Hsu |
| 6,246,963 B1 | 6/2001 | Cross et al. |
| 6,247,358 B1 | 6/2001 | Dos Santos |
| 6,328,104 B1 | 12/2001 | Graue |
| 6,434,435 B1 | 8/2002 | Tubel et al. |
| 6,480,790 B1 | 11/2002 | Calvert et al. |
| 6,540,018 B1 | 4/2003 | Vinegar et al. |
| 6,581,684 B2 | 6/2003 | Wellington et al. |
| 6,585,046 B2 | 7/2003 | Neuroth et al. |
| 6,589,303 B1 | 7/2003 | Lokhandwale et al. |
| 6,591,906 B2 | 7/2003 | Wellington et al. |
| 6,607,036 B2 | 8/2003 | Ranson et al. |
| 6,609,761 B1 | 8/2003 | Ramey et al. |
| 6,668,922 B2 | 12/2003 | Ziauddin et al. |
| 6,684,644 B2 | 2/2004 | Mittricker et al. |
| 6,684,948 B1 | 2/2004 | Savage |
| 6,708,758 B2 | 3/2004 | de Rouffignac et al. |
| 6,709,573 B2 | 3/2004 | Smith |
| 6,712,136 B2 | 3/2004 | de Rouffignac et al. |
| 6,715,546 B2 | 4/2004 | Vinegar et al. |
| 6,722,429 B2 | 4/2004 | de Rouffignac et al. |
| 6,742,588 B2 | 6/2004 | Wellington et al. |
| 6,745,831 B2 | 6/2004 | De Rouffignac et al. |
| 6,745,832 B2 | 6/2004 | Wellington et al. |
| 6,752,210 B2 | 6/2004 | de Rouffignac et al. |
| 6,754,588 B2 | 6/2004 | Cross et al. |
| 6,764,108 B2 | 7/2004 | Ernst et al. |
| 6,782,947 B2 | 8/2004 | de Rouffignac et al. |
| 6,796,139 B2 | 9/2004 | Briley et al. |
| 6,820,689 B2 | 11/2004 | Sarada |
| 6,832,485 B2 | 12/2004 | Surgarmen et al. |
| 6,854,929 B2 | 2/2005 | Vinegar et al. |
| 6,858,049 B2 | 2/2005 | Mittricker |
| 6,877,555 B2 | 4/2005 | Karanikas et al. |
| 6,880,633 B2 | 4/2005 | Wellington et al. |
| 6,887,369 B2 | 5/2005 | Moulton et al. |
| 6,896,053 B2 | 5/2005 | Berchenko et al. |
| 6,896,707 B2 | 5/2005 | O'Rear et al. |
| 6,913,078 B2 | 7/2005 | Shahin et al. |
| 6,918,444 B2 | 7/2005 | Passey et al. |
| 6,923,258 B2 | 8/2005 | Wellington et al. |
| 6,932,155 B2 | 8/2005 | Vinegar et al. |
| 6,948,562 B2 | 9/2005 | Wellington et al. |
| 6,951,247 B2 | 10/2005 | De Rouffignac et al. |
| 6,953,087 B2 | 10/2005 | de Rouffignac et al. |
| 6,964,300 B2 | 11/2005 | Vinegar et al. |
| 6,969,123 B2 | 11/2005 | Vinegar et al. |
| 6,988,549 B1 | 1/2006 | Babcock |
| 6,994,160 B2 | 2/2006 | Wellington et al. |
| 6,997,518 B2 | 2/2006 | Vinegar et al. |
| 7,001,519 B2 | 2/2006 | Linden et al. |
| 7,004,247 B2 | 2/2006 | Cole et al. |
| 7,004,251 B2 | 2/2006 | Ward et al. |
| 7,011,154 B2 | 3/2006 | Maher et al. |
| 7,028,543 B2 | 4/2006 | Hardage et al. |
| 7,032,660 B2 | 4/2006 | Vinegar et al. |
| 7,036,583 B2 | 5/2006 | de Rouffignac et al. |
| 7,048,051 B2 | 5/2006 | McQueen |
| 7,051,807 B2 | 5/2006 | Vinegar et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,093,655 B2 | 8/2006 | Atkinson |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |

(56) References Cited

U.S. PATENT DOCUMENTS

| | | |
|---|---|---|
| 7,104,319 B2 | 9/2006 | Vinegar et al. |
| 7,121,342 B2 | 10/2006 | Vinegar et al. |
| 7,124,029 B2 | 10/2006 | Jammes et al. |
| 7,165,615 B2 | 1/2007 | Vinegar et al. |
| 7,181,380 B2 | 2/2007 | Dusterhoft et al. |
| 7,198,107 B2 | 4/2007 | Maguire |
| 7,219,734 B2 | 5/2007 | Bai et al. |
| 7,225,866 B2 | 6/2007 | Berchenko et al. |
| 7,243,618 B2 | 7/2007 | Gurevich |
| 7,322,415 B2 | 1/2008 | de St. Remey |
| 7,331,385 B2 | 2/2008 | Symington et al. |
| 7,353,872 B2 | 4/2008 | Sandberg |
| 7,357,180 B2 | 4/2008 | Vinegar et al. |
| 7,441,603 B2 | 10/2008 | Kaminsky et al. |
| 7,461,691 B2 | 12/2008 | Vinegar et al. |
| 7,484,561 B2 | 2/2009 | Bridges |
| 7,516,785 B2 | 4/2009 | Kaminsky |
| 7,516,786 B2 | 4/2009 | Dallas et al. |
| 7,516,787 B2 | 4/2009 | Kaminsky |
| 7,546,873 B2 | 6/2009 | Kim et al. |
| 7,549,470 B2 | 6/2009 | Vinegar et al. |
| 7,556,095 B2 | 7/2009 | Vinegar |
| 7,617,869 B2 | 11/2009 | Carney |
| 7,631,691 B2 | 12/2009 | Symington et al. |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,857,056 B2 | 12/2010 | Kaminsky et al. |
| 7,860,377 B2 | 12/2010 | Vinegar et al. |
| 7,905,288 B2 | 3/2011 | Kinkead |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 | 4/2002 | Wellington et al. |
| 2002/0077515 A1 | 6/2002 | Wellington et al. |
| 2002/0099504 A1 | 7/2002 | Cross et al. |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0178195 A1 | 9/2003 | Agee et al. |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |
| 2003/0196789 A1 | 10/2003 | Wellington |
| 2003/0209348 A1 | 11/2003 | Ward et al. |
| 2003/0213594 A1 | 11/2003 | Wellington et al. |
| 2004/0020642 A1 | 2/2004 | Vinegar et al. |
| 2004/0140095 A1 | 7/2004 | Vinegar et al. |
| 2004/0198611 A1 | 10/2004 | Atkinson |
| 2004/0200618 A1 | 10/2004 | Piekenbrock |
| 2004/0211557 A1 | 10/2004 | Cole et al. |
| 2005/0051327 A1 | 3/2005 | Vinegar et al. |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0213657 A1 | 9/2006 | Berchenko et al. |
| 2007/0000662 A1 | 1/2007 | Symington et al. |
| 2007/0023186 A1 | 2/2007 | Kaminsky et al. |
| 2007/0045265 A1 | 3/2007 | McKinzie, II |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102359 A1 | 5/2007 | Lombardi et al. |
| 2007/0131415 A1 | 6/2007 | Vinegar et al. |
| 2007/0137869 A1 | 6/2007 | MacDougall et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. |
| 2008/0087420 A1 | 4/2008 | Kaminsky et al. |
| 2008/0087421 A1 | 4/2008 | Kaminsky |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0127632 A1 | 6/2008 | Finkenrath et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1 | 9/2008 | Kaminsky |
| 2008/0271885 A1 | 11/2008 | Kaminsky |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0308608 A1 | 12/2009 | Kaminsky et al. |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1 | 4/2010 | Symington et al. |
| 2010/0133143 A1 | 6/2010 | Roes et al. |
| 2010/0218946 A1 | 9/2010 | Symington et al. |
| 2010/0282460 A1 | 11/2010 | Stone et al. |
| 2010/0319909 A1 | 12/2010 | Symington et al. |
| 2011/0000221 A1 | 1/2011 | Minta et al. |
| 2011/0000671 A1 | 1/2011 | Hershkowitz et al. |

FOREIGN PATENT DOCUMENTS

| | | |
|---|---|---|
| CA | 2560223 | 3/2007 |
| EP | 0387846 | 9/1990 |
| FR | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 02/085821 | 10/2002 |
| WO | WO 2005/010320 | 2/2005 |
| WO | WO 2005/045192 | 5/2005 |
| WO | WO 2006/115943 | 11/2006 |
| WO | WO2007/033371 | 3/2007 |
| WO | WO2007/050445 | 5/2007 |
| WO | WO 2007/050479 | 5/2007 |
| WO | WO2010/047859 | 4/2010 |
| WO | WO 2011/116148 | 9/2011 |

OTHER PUBLICATIONS

Allred, (1964) "Some Characteristic Properties of Colorado Oil Shale Which May Influence in Situ Processing," *Quarterly Colo. School of Mines, 1st Symposium Oil Shale*, v.59. No. 3, pp. 47-75.

Asquith, G., et al. (2004) *Basic Well Log Analysis*, Second Ed., Chapter 1, pp. 1-20.

Ball, J.S., et al. (1949) "Composition of Colorado Shale-Oil Naphtha", *Industrial and Engineering Chemistry*, vol. 41, No. 3 pp. 581-587.

Barnes, A. L. et al. (1968) "Quarterly of the Colorado School of Mines" *Fifth Symposium on Oil Shale*, v. 63(4), Oct. 1968, pp. 83-108.

(56) References Cited

OTHER PUBLICATIONS

Bastow, T.P., (1998) Sedimentary Processes Involving Aromatic Hydrocarbons ›. Thesis (PhD in Applied Chemistry) Curtin University of Technology (Australia), December, p. 102.

Baugman, G. L. (1978) *Synthetic Fuels Data Handbook*, Second Edition, Cameron Engineers Inc.

Berry, K. L., et al. (1982) "Modified in situ retorting results of two field retorts", Gary, J. H., ed., 15th Oil Shale Symp., CSM, pp. 385-396.

Blanton, T. L. et al, (1999) "Stress Magnitudes from Logs: Effects of Tectonic Strains and Temperature", *SPE Reservoir Eval. & Eng. 2*, vol. 1, February, pp. 62-68.

Boyers, H. E. et al. (1985) "Chapter 16: Heat-Resistant Materials," *Metals Handbook*, American Society for Metals, 16 pages.

Brandt, A. R., "Converting Oil Shale to Liquid Fuels: Energy Inputs and Greenhouse Gas Emissions of the Shell in Situ Conversion Process," Environ. Sci. Technol. 2008, 42, pp. 7489-7495.

Brandt, H. et al. (1965) "Stimulating Heavy Oil Reservoirs With Downhole Air-Gas Burners," *World Oil*, (Sep. 1965), pp. 91-95.

Bridges, J. E., et al. (1983) "The IITRI in situ fuel recovery process", *J. Microwave Power*, v. 18, pp. 3-14.

Burnham, A. K. et al. (1983) "High-Pressure Pyrolysis of Green River Oil Shale" in Geochemistry and Chemistry of Oil Shales: ACS Symposium Series.

Burwell, E. L. et al. (1970) "Shale Oil Recovery by In-Situ Retorting—A Pilot Study" Journal of Petroleum Engr., Dec. 1970, pp. 1520-1524.

Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.

Chute, F. S., and Vermeulen, F. E., (1988) "Present and potential applications of electromagnetic heating in the in situ recovery of oil", AOSTRA J. Res., v. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Cipolla, C.L., et al. (1994), "Practical Application of in-situ Stress Profiles", *Society of Petroleum Engineers*, SPE 28607, pp. 487-499.

Cook, G. L. et al. (1968) "The Composition of Green River Shale Oils" United Nations Symposium of the Development and Utilization of Oil Shale Resources, 23 pgs.

Covell, J. R., et al. (1984) "Indirect in situ retorting of oil shale using the TREE process", Gary, J. H., ed., 17th Oil Shale Symposium Proceedings, Colorado School of Mines, pp. 46-58.

Cummins, J. J. et al. (1972) "Thermal Degradation of Green River Kerogen at 150 to 350°C.: Rate of Product Formation, Report of Investigation 7620," US Bureau of Mines, 1972.

Day, R. L., (1998) "Solution Mining of Colorado Nahcolite, Wyoming State Geological Survey Public Information Circular 40," *Proceedings of the First International Soda Ash Conference*, V.II (Rock Springs, Wyoming, Jun. 10-12) pp. 121-130.

DePriester, C. et al. (1963) "Well Stimulation by Downhole Gas-Air Burner," *Jrnl. Petro. Tech.*, (Dec. 1963), pp. 1297-1302.

Domine, F. et al. (2002) "Up to What Temperature is Petroleum Stable? New Insights from a 5200 Free Radical Reactions Model", *Organic Chemistry*, 33, pp. 1487-1499.

Dougan, P. M. et al. (1981) "BX in Situ Oil Shale Project," *Colorado School of Mines; Fourteenth Oil Shale Symposium Proceedings*, 1981, pp. 118-127.

Dougan, P. M. (1979) "The BX in Situ Oil Shale Project," *Chem. Engr. Progress*, pp. 81-84.

Duncan, D. C., (1967) "Geologic Setting of Oil Shale Deposits and World Prospects," in *Proceedings of the Seventh World Petroleum Congress*, v.3, Elsevier Publishing, pp. 659-667.

Dunks, G. et al. (1983) "Electrochemical Studies of Molten Sodium Carbonate," *Inorg. Chem.*, 22, pp. 2168-2177.

Dusseault, M.B. (1998) "Casing Shear: Causes, Cases, Cures", Society of Petroleum Engineers, SPE 48,864 pp. 337-349.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fainberg, V. et al. (1998) "Integrated Oil Shale Processing Into Energy and Chemicals Using Combined-Cycle Technology," *Energy Sources*, v.20.6, Abstract, 1 page.

Farouq Ali, S. M., (1994), "Redeeming features of in situ combustion", DOE/NIPER *Symposium on in Situ Combustion Practices—Past, Present, and Future Application*, Tulsa, OK, Apr. 21-22, No. ISC 1, p. 3-8.

Fisher, S. T. (1980) "A Comparison of Eleven Processes for Production of Energy from the Solid Fossil Fuels of North America," *SPE* 9098, pp. 1-27.

Fox, J. P, (1980) "Water-related Impacts of In-Situ Oil Shale Processing," *California Univ., Berkeley, Lawrence Berkeley Lab*, Chapters 6-7.

Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.

Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.

Fredrich, J. T. et al, (2003) "Stress Perturbations Adjacent to Salt Bodies in the Deepwater Gulf of Mexico", *Society of Petroleum Engineers* SPE 84554, pp. 1-14.

Frederiksen, S. et al, (2000) "A Numerical Dynamic Model for the Norwegian-Danish Basin", *Tectonophysics*, 343, 2001, pp. 165-183.

Freund, H. et al., (1989) "Low-Temperature Pyrolysis of Green River Kerogen", *The American Association of Petroleum Geologists Bulletin*, v. 73, No. 8 (August) pp. 1011-1017.

Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.

Garthoffner, E. H., (1998), "Combustion front and burned zone growth in successful California ISC projects", SPE 46244, pp. 1-11.

Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.

Hansen, K. S. et al, (1989) "Earth Stress Measurements in the South Belridge Oil Field, Kern County, California", *SPE Formation Evaluation*, December pp. 541-549.

Hansen, K. S. et al, (1993) "Finite-Element Modeling of Depletion-Induced Reservoir Compaction and Surface Subsidence in the South Belridge Oil Field, California", SPE 26074, pp. 437-452.

Hansen, K. S. et al, (1995) "Modeling of Reservoir Compaction and Surface Subsidence at South Belridge", *SPE Production & Facilities*, August pp. 134-143.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Hardy, M., et al. (2003) "Solution Mining of Nahcolite at American Soda's Yankee Gulch Project," *Mining Engineering*, Oct. 2003, pp. 23-31.

Henderson, W, et al. (1968) "Thermal Alteration as a Contributory Process to the Genesis of Petroleum", *Nature* vol. 219, pp. 1012-1016.

Hilbert, L. B. et al, (1999) "Field-Scale and Wellbore Modeling of Compaction-Induced Casing Failures", *SPE Drill. & Completion*, 14(2), June pp. 92-101.

Hill, G.R. et al. (1967) "The Characteristics of a Low Temperature in Situ Shale Oil," $4^{th}$ *Symposium on Oil Shale, Quarterly of the Colorado School of Mines*, v.62(3), pp. 641-656.

Hill, G. R. et al. (1967) "Direct Production of a Low Pour Point High Gravity Shale Oil", *I&EC Product Research and Development*, 6(1), March pp. 52-59.

Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.

(56) References Cited

OTHER PUBLICATIONS

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-91.

Humphrey, J. P. (1978) "Energy from in situ processing of Antrim oil shale", *DOE Report FE-2346-29*.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Jacobs, H. R. (1983) "Analysis of the Effectiveness of Steam Retorting of Oil Shale", *AIChE Symposium Series—Heat Transfer*—Seattle 1983 pp. 373-382.

Johnson, D. J. (1966) "Decomposition Studies of Oil Shale," *University of Utah*, May 1966.

Katz, D.L. et al. (1978) "*Predicting Phase Behavior of Condensate/Crude-Oil Systems Using Methane Interaction Coefficients, J. Petroleum Technology*", pp. 1649-1655.

Kenter, C. J. et al, (2004) "Geomechanics and 4D: Evaluation of Reservoir Characteristics from Timeshifts in the Overburden", *Gulf Rocks 2004, 6th North America Rock Mechanics Symposium (NARMS): Rock Mechanics Across Borders and Disciplines*, Houston, Texas, Jun. 5-9, ARMA/NARMS 04-627.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Lekas, M. A. et al. (1991) "Initial evaluation of fracturing oil shale with propellants for in situ retorting—Phase 2", *DOE Report DOE/MC/11076-3064*.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.

Lundquist, L. (1951) "Refining of Swedish Shale Oil", *Oil Shale Cannel Coal Conference*, vol./Issue: 2, pp. 621-627.

Marotta, A. M. et al, (2003) "Numerical Models of Tectonic Deformation at the Baltica-Avalonia Transition Zone During the Paleocene Phase of Inversion", *Tectonophysics*, 373, pp. 25-37.

Miknis, F.P, et al (1985) "Isothermal Decomposition of Colorado Oil Shale", DOE/FE/60177-2288 (DE87009043) May 1985.

Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.

Molenaar, M. M. et al, (2004) "Applying Geo-Mechanics and 4D: '4D In-Situ Stress' as a Complementary Tool for Optimizing Field Management", *Gulf Rocks 2004, 4th North America Rock Mechanics Symposium (NARMS): Rock Mechanics Across Borders and Disciplines*, Houston, Texas, Jun. 5-9, ARMA/NARMS 04-639, pp. 1-7.

Moschovidis, Z. (1989) "Interwell Communication by Concurrent Fracturing—a New Stimulation Technique", *Journ. of Canadian Petro. Tech.* 28(5), pp. 42-48.

Motzfeldt, K. (1954) "The Thermal Decomposition of Sodium Carbonate by the Effusion Method," *Journ. Phys. Chem.*, v. LIX, pp. 139-147.

Mut, Stephen (2005) "The Potential of Oil Shale," *Shell Oil Presentation at National Academies, Trends in Oil Supply Demand*, in Washington, DC, Oct. 20-21, 2005, 11 pages.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.

Nottenburg, R.N. et al. (1979) "Temperature and stress dependence of electrical and mechanical properties of Green River oil shale," *Fuel*, 58, pp. 144-148.

Nowacki, P. (ed.), (1981) *Oil Shale Technical Handbook*, Noyes Data Corp.

Pattillo, P. D. et al, (1998) "Reservoir Compaction and Seafloor Subsidence at Valhall", SPE 47274, 1998, pp. 377-386.

Pattillo, P. D. et al, (2002) "Analysis of Horizontal Casing Integrity in the Valhall Field", SPE 78204, pp. 1-10.

Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.

Peters, G., (1990) "The Beneficiation of Oil Shale by the Solution Mining of Nahcolite," *23rd Colorado School of Mines Oil Shale Symposium* (Golden, CO) pp. 142-151.

Plischke, B., (1994) "Finite Element Analysis of Compaction and Subsidence—Experience Gained from Several Chalk Fields", *Society of Petroleum Engineers*, SPE 28129, 1994, pp. 795-802.

Prats, M. et al. (1975) "The Thermal Conductivity and Diffusivity of Green River Oil Shales", *Journal of Petroleum Technology*, pp. 97-106, Jan. 1975.

Prats, M., et al. (1977) "Soluble-Salt Processes for In-Situ Recovery of Hydrocarbons from Oil Shale," *Journal of Petrol. Technol.*, pp. 1078-1088.

Rajeshwar, K. et al. (1979) "Review: Thermophysical Properties of Oil Shales", *Journal of Materials Science*, v.14, pp. 2025-2052.

Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).

Reade Advanced Materials; Electrical resistivity of materials. Retrieved from internet: http://www.reade.com/Particle%5FBriefings/elec%5Fres.html.

Riva, D. et al. (1998) "Suncor down under: the Stuart Oil Shale Project", Annual Meeting of the *Canadian Inst. of Mining, Metallurgy, and Petroleum*, Montreal, May 3-7.

Rupprecht, R. (1979) "Application of the Ground-Freezing Method to Penetrate a Sequence of Water-Bearing and Dry Formations—Three Construction Cases," *Engineering Geology*, 13, pp. 541-546.

Ruzicka, D.J. et al. (1987) "Modified Method Measures Bromine Number of Heavy Fuel Oils", *Oil & Gas Journal*, 85(31), Aug. 3, pp. 48-50.

Salamonsson, G. (1951) "The Ljungstrom in Situ Method for Shale-Oil Recovery," *2nd Oil Shale and Cannel Coal Conference*, 2, Glasgow, Scotland, Inst. of Petrol., London, pp. 260-280.

Sahu, D. et al. (1988) "Effect of Benzene and Thiophene on Rate of Coke Formation During Naphtha Pyrolysis", *Canadian Journ. of Chem. Eng.*, 66, October pp. 808-816.

Sandberg, C. R. et al. (1962) "In-Situ Recovery of Oil from Oil Shale—A Review and Summary of Field and Laboratory Studies," RR62.039FR, Nov. 1962.

Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001, 17 pages.

Siskin, M. et al. (1995) "Detailed Structural Characterization of the Organic Material in Rundel Ramsay Crossing and Green River Oil Shales," *Kluwer Academic Publishers*, pp. 143-158.

Smart, K. J. et al, (2004) "Integrated Structural Analysis and Geomechanical Modeling: an Aid to Reservoir Exploration and Development", *Gulf Rocks 2004, 6th North America Rock Mechanics Symposium (NARMS): Rock Mechanics Across Borders and Disciplines*, Houston, Texas, Jun. 5-9, ARMA/NARMS 04-470.

(56) References Cited

OTHER PUBLICATIONS

Smith, F. M. (1966) "A Down-hole Burner—Versatile Tool for Well Heating," *25th Tech. Conf. on Petroleum Production*, Pennsylvania State Univ., pp. 275-285.
Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.
Stevens, A. L., and Zahradnik, R. L. (1983) "Results from the simultaneous processing of modified in situ retorts 7& 8", Gary, J. H., ed., *16th Oil Shale Symp.*, CSM, p. 267-280.
Stoss, K. et al. (1979) "Uses and Limitations of Ground Freezing With Liquid Nitrogen," *Engineering Geology*, 13, pp. 485-494.
Symington, W.A., et al (2006) ExxonMobil's electrofrac process for in situ oil shale conversion *26th Oil Shale Symposium*, Colorado School of Mines.
Syunyaev, Z.I. et al. (1965) "Change in the Resistivity of Petroleum Coke on Calcination," Chemistry and Technology of Fuels and Oils, 1(4), pp. 292-295.
Templeton, C. C. (1978) "Pressure-Temperature Relationship for Decomposition of Sodium Bicarbonate from 200 to 600° F.," *J. of Chem. and Eng. Data*, 23(1), pp. 7-8.
Thomas, A. M. (1963) "Thermal Decomposition of Sodium Carbonate Solutions," *J. of Chem. and Eng. Data*, 8(1), pp. 51-54.
Thomas, G.W. (1964) "A Simplified Model of Conduction Heating in Systems of Limited Permeability," *Soc.Pet. Engineering Journal*, Dec. 1964, pp. 335-344.
Thomas, G. W. (1966) "Some Effects of Overburden Pressure on Oil Shale During Underground Retorting," *Society of Petroleum Engineers Journal*, pp. 1-8, Mar. 1966.
Tihen, S. S. Et al. (1967) "Thermal Conductivity and Thermal Diffusivity of Green River Oil Shale," *Thermal Conductivity: Proceedings of the Seventh Conference* (Nov. 13-16, 1967), NBS Special Publication 302, pp. 529-535, 1968.
Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.
Tisot, P. R. et al. (1971) "Structural Deformation of Green River Oil Shale as It Relates to in Situ Retorting," *US Bureau of Mines Report of Investigations 7576*, 1971.
Tisot, P. R. (1975) "Structural Response of Propped Fractures in Green River Oil Shale as It Relates to Underground Retorting," *US Bureau of Mines Report of Investigations 8021*.
Tissot, B. P., and Welte, D. H. (1984) *Petroleum Formation and Occurrence*, New York, Springer-Verlag, p. 160-174, 175-198 and 254-266.
Tissot, B. P., and Welte, D. H. (1984) *Petroleum Formation and Occurrence*, New York, Springer-Verlag, p. 267-289 and 470-492.
Tyner, C. E. et al. (1982) "Sandia/Geokinetics Retort 23: a horizontal in situ retorting experiment", Gary, J. H., ed., *15th Oil Shale Symp.*, CSM, p. 370-384.
Turta, A., (1994), "In situ combustion—from pilot to commercial application", *DOE/NIPER Symposium on in Situ Combustion Practices—Past, Present, and Future Application*, Tulsa, OK, Apr. 21-22, No. ISC 3, p. 15-39.
Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.
Veatch, Jr. R.W. and Martinez, S.J., et al. (1990) "Hydraulic Fracturing: Reprint Series No. 28", *Soc. of Petroleum Engineers* SPE 14085, Part I, Overview.
Warpinski, N.R., (1989) "Elastic and Viscoelastic Calculations of Stresses in Sedimentary Basins", *SPE Formation Evaluation*, vol. 4, pp. 522-530.
Yen, T. F. et al. (1976) *Oil Shale*, Amsterdam, Elsevier, p. 216-267.
Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.
Oil & Gas Journal, 1998, "Aussie oil shale project moves to Stage 2", Oct. 26, p. 42.

"Encyclopedia of Chemical Technology" (4th ed.), *Alkali and Chlorine Products*, pp. 1025-1039 (1998).
EP Search Report dated Dec. 29, 2003 (RS 110243, Corresponding to US Pat 7,331,385).
EP Search Report dated Mar. 17, 2004 (RS 110686, Corresponding to U.S. Patent 7,441,603).
EP Search Report, Supplementary dated Apr. 10, 2007 (EP 04 77 9878 Corresponding to U.S. Patent 7,441,603).
EP Search Report dated Apr. 29, 2005 (RS 112183, Corresponding to U.S. Appl. No. 11/250,804, Published as US 2006/0100837 on May 11, 2008).
EP Search Report dated Jun. 2, 2006 (RS113865, corresponding to U.S. Appl. No. 11/726,651).
EP Search Report dated Feb. 16, 2007 (RS 114808, Corresponding to U.S. Appl. No. 11/973,746, Published as US 2008/0087420 on May 17, 2008).
EP Search Report dated Feb. 16, 2007 (RS 114804, Corresponding to U.S. Appl. No. 11/973,750, Published as US 2008/0087427 on Apr. 17, 2008).
EP Search Report dated Mar. 21, 2007 (RS 114890, Corresponding to U.S. Patent 7,516,787).
EP Search Report dated Feb. 16, 2007 (RS 114807, Corresponding to U.S. Patent 7,669,657).
EP Search Report dated Nov. 13, 2007 (RS 115479, Corresponding to U.S. Appl. No. 12/148,414).
EP Search Report dated Aug. 29, 2007 (No. RS115553, Corresponding to U.S. Appl. No. 12/148,388).
EP Search Report dated Jul. 4, 2007 ( RS 115341 Corresponding to U.S. Appl. No. 12/074,899).
EP Search Report dated Jul. 5, 2007 (RS 115432 Corresponding to U.S. Appl. No. 12/075,087).
EP Search Report dated Mar. 12, 2009 (EP 08 00 3956,—Corresponding to U.S. Appl. No. 12/271,521).
EP Search Report dated Aug. 29, 2007 (RS 1155554, Corresponding to U.S. Appl. No. 12/154,238).
EP Search Report dated Aug. 28, 2007 (RS 1155555, Corresponding to U.S. Appl. No. 12/154,256).
International Search Report for PCT/US01/09247 Jun. 20, 2001.
International Search Report for PCT/US04/11508, Jan. 5, 2005.
International Search Report for PCT/US08/88045, Feb. 12, 2009.
International Search Report for PCT/US04/24947 Mar. 10, 2005.
International Search Report for PCT/US07/07133, Jan. 4, 2008.
International Search Report for PCT/US07/21673 Jun. 24, 2008.
International Search Report for PCT/US07/21668 Apr. 29, 2008.
International Search Report for PCT/US07/21666 Apr. 4, 2008.
International Search Report for PCT/US07/21669, Apr. 29, 2008.
International Search Report for PCT/US07/21660 Apr. 4, 2008.
International Search Report for PCT/US07/021968, May 14, 2008.
International Search Report for PCT/US07/021968, May 21, 2008.
International Search Report for PCT/US08/005008, Aug. 29, 2008.
International Search Report for PCT/US08/05056, Aug. 25, 2008.
International Search Report for PCT/US/08/003069, Jun. 25, 2008.
International Search Report for PCT/US08/003043, Jul. 2, 2008.
International Search Report for PCT/US08/083815, Mar. 20, 2009.
International Search Report for PCT/US08/006462 Sep. 22, 2008.
International Search Report for PCT/US08/006463 Aug. 22, 2008.
International Search Report for PCT/US07/21645 Apr. 21, 2008.
International Search Report for PCT/US09/037419 Jul. 7, 2009.
International Search Report for PCT/US09/055403, Oct. 22, 2009.
International Search Report for PCT/US10/20342 Feb. 26, 2010.
International Search Report for PCT/US10/031910 Aug. 3, 2010.
International Search Report for PCT/US10/057204 Jan. 27, 2011.
U.S. Appl. No. 12/630,636 Office Action mailed Oct. 27, 2010.
U.S. Appl. No. 11/250,804 Office Action mailed Oct. 16, 2008.
U.S. Appl. No. 11/250,804 Office Action mailed Jun. 11, 2009.
U.S. Appl. No. 11/973,746 Office Action mailed Jun. 25, 2009.
U.S. Appl. No. 11/973,746 Office Action mailed Nov. 8, 2010.
U.S. Appl. No. 11/973,750 Office Action mailed Dec. 4, 2008.
U.S. Appl. No. 11/973,750 Office Action mailed Jul. 22, 2009.
U.S. Appl. No. 12/638,630 Office Action mailed Mar. 16, 2011.
U.S. Appl. No. 12/712,904 Office Action mailed Nov. 10, 2010.
U.S. Appl. No. 12/148,414 Office Action mailed May 19, 2010.
U.S. Appl. No. 12/148,414 Office Action mailed Oct. 22, 2010.

(56) References Cited

OTHER PUBLICATIONS

U.S. Appl. No. 12/148,388 Office Action mailed Jun. 10, 2010.
U.S. Appl. No. 12/148,388 Office Action mailed Nov. 19, 2010.
U.S. Appl. No. 12/074,899 Office Action mailed Dec. 16, 2009.
U.S. Appl. No. 12/074,899 Office Action mailed Jul. 26, 2010.
U.S. Appl. No. 12/074,899 Office Action mailed Jan. 4, 2011.
U.S. Appl. No. 12/075,087 Office Action mailed Oct. 12, 2010.
U.S. Appl. No. 12/075,087 Office Action mailed Mar. 7, 2011.
U.S. Appl. No. 12/271,521 Office Action mailed Nov. 2, 2010.
U.S. Appl. No. 11/973,898 Office Action mailed May 6, 2010.
U.S. Appl. No. 11/973,898 Office Action mailed Dec. 20, 2010.
U.S. Appl. No. 12/405,901 Office Action mailed Feb. 14, 2011.
U.S. Appl. No. 12/154,238 Office Action mailed Apr. 22, 2011.
U.S. Pat No. 6,918,444—Office Action mailed Sep. 16, 2004.
US Pat No. 7,331,385—Office Action mailed Jul. 12, 2007.
U.S. Pat No. 7,631,691—Office Action mailed Mar. 18, 2009.
U.S. Pat No. 7,441,603—Office Action mailed Feb. 25, 2008.
U.S. Pat No. 7,857,056—Office Action mailed Mar. 19, 2010.
US Pat No. 7,516,785—Office Action mailed Apr. 2, 2008.
US Pat No. 7,516,787—Office Action mailed Apr. 3, 2008.
U.S. Pat No. 7,647,972—Office Action mailed May 19, 2009.
U.S. Pat No. 7,647,971—Office Action mailed May 21, 2009.
U.S. Pat No. 7,669,657—Office Action mailed Jun. 26, 2008.
U.S. Pat No. 7,669,657—Office Action mailed Dec. 15, 2008.
U.S. Pat No. 7,669,657—Office Action mailed Sep. 15, 2009.
US Pat No. 7,644,993—Office Action mailed Jun. 24, 2009.

OPTIMIZED WELL SPACING FOR IN SITU SHALE OIL DEVELOPMENT

STATEMENT OF RELATED APPLICATIONS

This application is a continuation of U.S. patent application Ser. No. 11/973,746, filed on 10 Oct. 2007 now abandoned, which application claims the benefit of U.S. Provisional Application No. 60/851,541, which was filed on Oct. 13, 2006. This application is also a continuation-in-part of U.S. patent application Ser. No. 12/630,636, filed on 3 Dec. 2009 now abandoned, which is a continuation of U.S. patent application Ser. No. 12/011,456 filed on Jan. 25, 2008 now U.S. Pat. No. 7,631,691, now allowed, which is a continuation-in-part of U.S. application Ser. No. 10/558,068, filed Nov. 22, 2005 now U.S. Pat. No. 7,331,385, which is the National Stage Application of International Application No. PCT/US2004/011508, filed Apr. 14, 2004, which claims the benefit of both U.S. Provisional Application Nos. 60/482,135 filed on Jun. 24, 2003 and 60/511,994 filed on Oct. 16, 2003. All of the above-referenced applications are incorporated herein by reference in their entirety for all purposes.

BACKGROUND

1. Field

The present invention relates to the field of hydrocarbon recovery from subsurface formations. More specifically, the present invention relates to the in situ recovery of hydrocarbon fluids from organic-rich rock formations, including, for example, oil shale formations, coal formations and tar sands formations. The present invention also relates to the arrangement of wellbores in a shale oil development area.

2. Background

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Oil shale formations tend to reside at relatively shallow depths. In the United States, oil shale is most notably found in Wyoming, Colorado, and Utah. These formations are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T. F. Yen, and G. V. Chilingarian, "Oil Shale," Amsterdam, Elsevier, p. 292, the entire disclosure of which is incorporated herein by reference.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ to distill and produce hydrocarbons. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "*The Ljungstrom In Situ Method for Shale-Oil Recovery,*" 2$^{nd}$ Oil Shale and Cannel Coal Conference, v. 2, Glasgow, Scotland, Institute of Petroleum, London, p. 260-280 (1951), the entire disclosure of which is incorporated herein by reference.)

Additional in situ methods have been proposed. These methods generally involve the injection of heat and/or solvent into a subsurface oil shale. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W.

Hoover, et al.), heat fracturing (see U.S. Pat. No. 3,284,281 to R. W. Thomas), and steam fracturing (see U.S. Pat. No. 2,952, 450 to H. Purre).

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's application. The '118 patent proposed controlling the rate of heat conduction within the rock surrounding each heat injection well to provide a uniform heat front.

Additional history behind oil shale retorting and shale oil recovery can be found in co-owned patent publication WO 2005/010320 entitled "Methods of Treating a Subterranean Formation to Convert Organic Matter into Producible Hydrocarbons," and in patent publication WO 2005/045192 entitled "Hydrocarbon Recovery from Impermeable Oil Shales." The Background and technical disclosures of these two patent publications are incorporated herein by reference.

A need exists for improved processes for the production of shale oil. A need further exists for improved methods for heating a subsurface formation in connection with formation pyrolysis, and for the spacing of wells in a hydrocarbon development area.

SUMMARY

A method for spacing heater wells for an in situ conversion process is provided. The method includes the steps of determining a direction along which thermal energy will travel most efficiently through a subsurface formation, and completing a plurality of heater wells in the subsurface formation, with the heater wells being spaced farther apart in the determined direction than in a direction transverse to the determined direction. Preferably, the subsurface formation comprises kerogen.

In one aspect, the step of determining a direction along which thermal energy will travel through the subsurface formation most efficiently is performed based upon a review of geological data pertaining to the subsurface formation. The geological data may comprise the direction of least horizontal principal stress in the subsurface formation. The direction along which thermal energy travels through the subsurface formation most efficiently may be substantially perpendicular to the direction of least horizontal principal stress. Alternatively, the direction along which thermal energy travels through the subsurface formation most efficiently may be substantially parallel to the direction of least horizontal principal stress.

The geological data may comprise the direction of bedding in the subsurface formation. In this instance, the direction along which thermal energy will travel through the subsurface formation most efficiently may be substantially along the direction of bedding of the subsurface formation.

The geological data may comprise the tilt of the subsurface formation and the relative spacing with the surface topography. In this instance, the direction along which thermal energy will travel through the subsurface formation most efficiently may be along a direction of upward tilt of the subsurface formation relative to either the surface topography or sea level.

In another aspect, the step of determining a direction along which thermal energy will travel through the subsurface formation most efficiently is performed based upon a review of formation temperature gradient data from previous in situ conversion processes in other areas of the subsurface formation.

The methods may also include the steps of completing one or more production wells through the subsurface formation, and then producing hydrocarbons through the production wells. The production wells may be aligned in the determined direction.

Various arrangements may be used for the heater wells. In one aspect, the heater wells are aligned in one row. In another aspect, the heater wells are aligned in two or more rows. The pattern of heater wells may be a line drive pattern such that two lines of heater wells are placed on opposite sides of a line of production wells. In yet another aspect, the heater wells may define sets of well patterns aligned in the determined direction, with each set having a production well completed through the surface formation. Such patterns may be 3-spot patterns, 5-spot patterns, 6-spot patterns, 7-spot patterns, or other patterns. Such patterns may be sets of 3-spot and 5-spot patterns combined.

In one arrangement, a plurality of well patterns are elongated in the determined direction. The patterns of heater wells may comprise a first pattern around a corresponding production well, and a second pattern around the first pattern.

In any of the above instances, the elongation ratio may be about 1.20 to 2.50. In one aspect, the elongation ratio is about 2.0 to 2.5.

In another embodiment, the present disclosure offers a method for spacing heater wells for an in situ conversion process within an area of development in which the method includes the steps of determining a direction along which thermal energy will travel most efficiently through a subsurface formation within the development area, and completing a plurality of heater wells in the subsurface formation. In this method, the heater wells have a density that is lower in the determined direction than in a direction transverse to the determined direction. Preferably, the subsurface formation comprises kerogen. The step of determining a direction along which thermal energy will travel through the subsurface formation most efficiently may again be based upon a review of geological data pertaining to the subsurface formation.

In one embodiment of the above methods, the step of determining a direction along which thermal energy will travel through the subsurface formation most efficiently is performed based upon computer modeling of characteristics of the subsurface formation. Various characteristics may be used. These include the direction of least horizontal principal stress in the subsurface formation, the direction of bedding in the subsurface formation, or the tilt of the subsurface formation and surface topography. Other characteristics comprise the organic carbon content of the kerogen, hydrogen index of the subsurface formation, initial formation permeability, depth of the subsurface formation, thickness of the subsurface formation, and modified Fischer Assay analyses. Still additional characteristics may be fluid flow and thermal gradient derived from simulations.

The present inventions also include a method for arranging heater wells for an in situ kerogen conversion process. In one aspect, the method includes providing a production well, and completing a plurality of heater wells around the production well such that the plurality of heater wells comprise a first layer of heater wells around the production well, and then a second layer of heater wells around the first layer. In this method, the heater wells in the second layer of wells are arranged relative to the heater wells in the first layer of wells so as to minimize secondary cracking of hydrocarbons converted from the kerogen as the hydrocarbons flow from the second layer of wells to the production well. The first and second layers may optionally comprise heater wells that are elongated in a direction in which thermal energy travels most efficiently through a targeted subsurface formation.

In this method, the heater wells are preferably completed substantially vertically. The plurality of heater wells and the production well are arranged such that the majority of hydrocarbons generated by heat from each heater well in the second layer of wells are able to migrate to the production well without passing near a heater well in the first layer of wells. This may be done by offsetting the heater wells in the second layer of wells from the heater wells in the first layer of wells relative to the production well. In another aspect, the plurality of heater wells and the production well are arranged such that the majority of hydrocarbons generated by heat from each heater well is able to migrate to the production well without passing through a zone of substantially increasing formation temperature.

The present inventions include another method for spacing heater wells for an in situ conversion process. In one aspect, the method includes forming a production well through a subsurface formation, and also completing a plurality of substantially vertical heater wells through the subsurface formation in order to pyrolyze solid hydrocarbons therein. In this method, the heater wells are spaced around the production well such that a heat front emanating from each heater well reaches the production well at substantially the same time. Preferably, the subsurface formation comprises kerogen. The heater wells may be spaced in a three-spot pattern around the production well, or other pattern. The method may further include the step of determining a direction along which thermal energy will travel most efficiently through the subsurface formation.

BRIEF DESCRIPTION OF THE DRAWINGS

So that the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
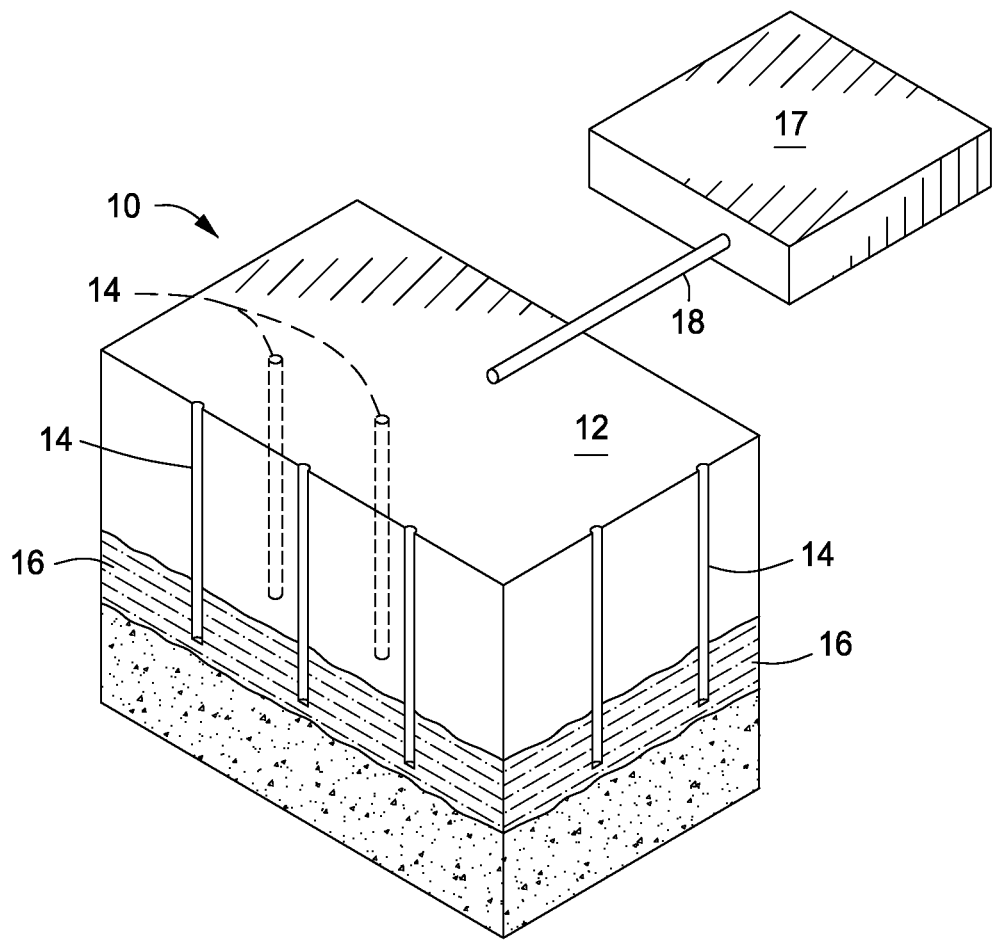
FIG. 1 is a cross-sectional view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees. "Tar sands" refers to a formation that has tar in it.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are both soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

Description of Specific Embodiments

The inventions are described herein in connection with certain specific embodiments. However, to the extent that the following detailed description is specific to a particular embodiment or a particular use, such is intended to be illustrative only and is not to be construed as limiting the scope of the inventions.

As discussed herein, some embodiments of the inventions include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the inventions the natural resources may include hydrocarbon fluids, including, for example, products of the pyrolysis of formation hydrocarbons such as oil shale. In some embodiments of the inventions the natural resources may also include water-soluble minerals, including, for example, nahcolite (sodium bicarbonate, or $NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production of an oil shale formation occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas and water produced from the heated formation. The fluid processing facility 17 may further include equipment for separating out dissolved water-soluble minerals and/or migratory contaminant species including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
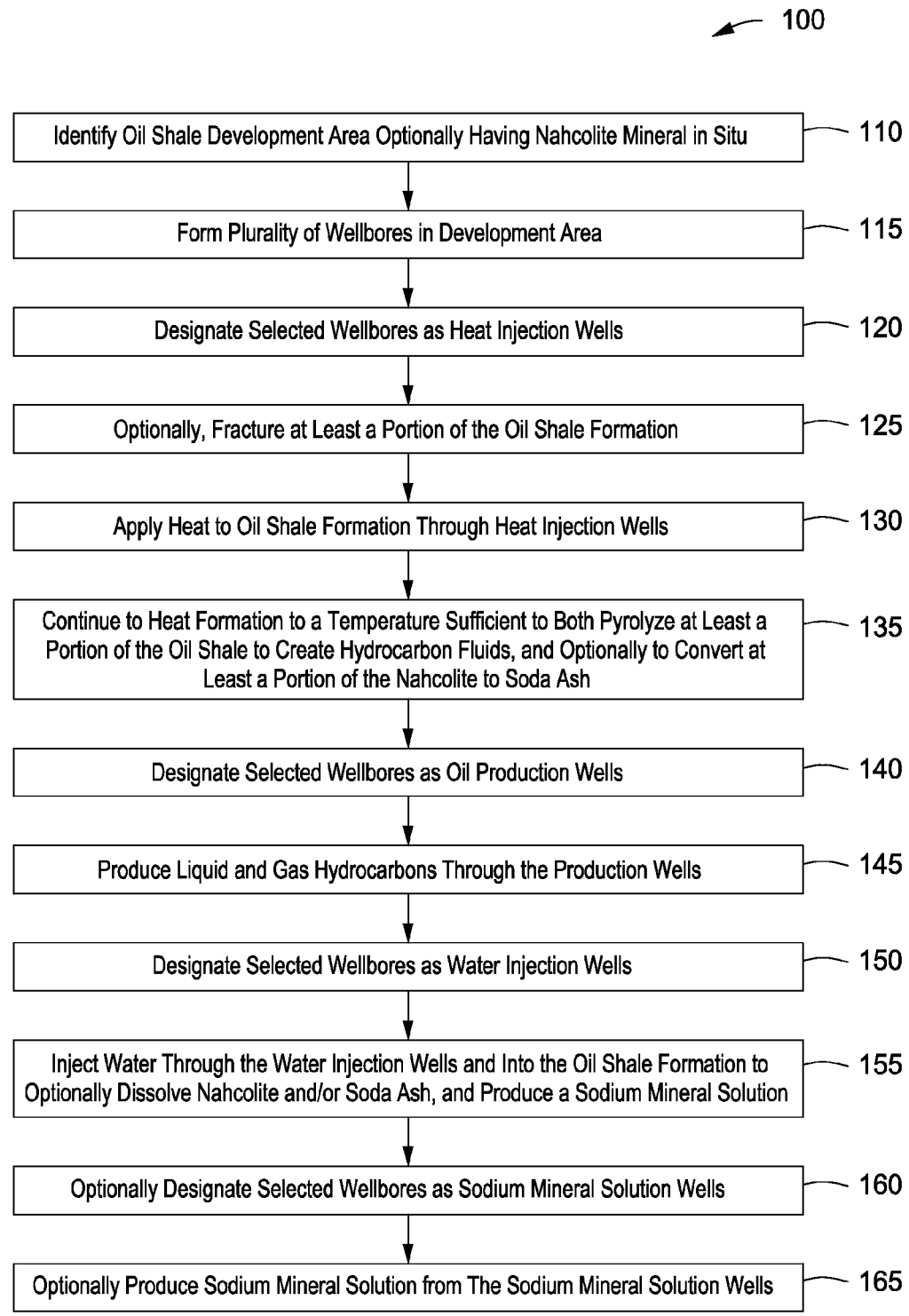
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and hydrocarbon fluid-generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naptha. Generated gases include light alkanes, light alkenes, $H_2$, $CO_2$, CO, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability of portions of the formation are increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability in portions of the formation and/or be used to provide a planar source for heating.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
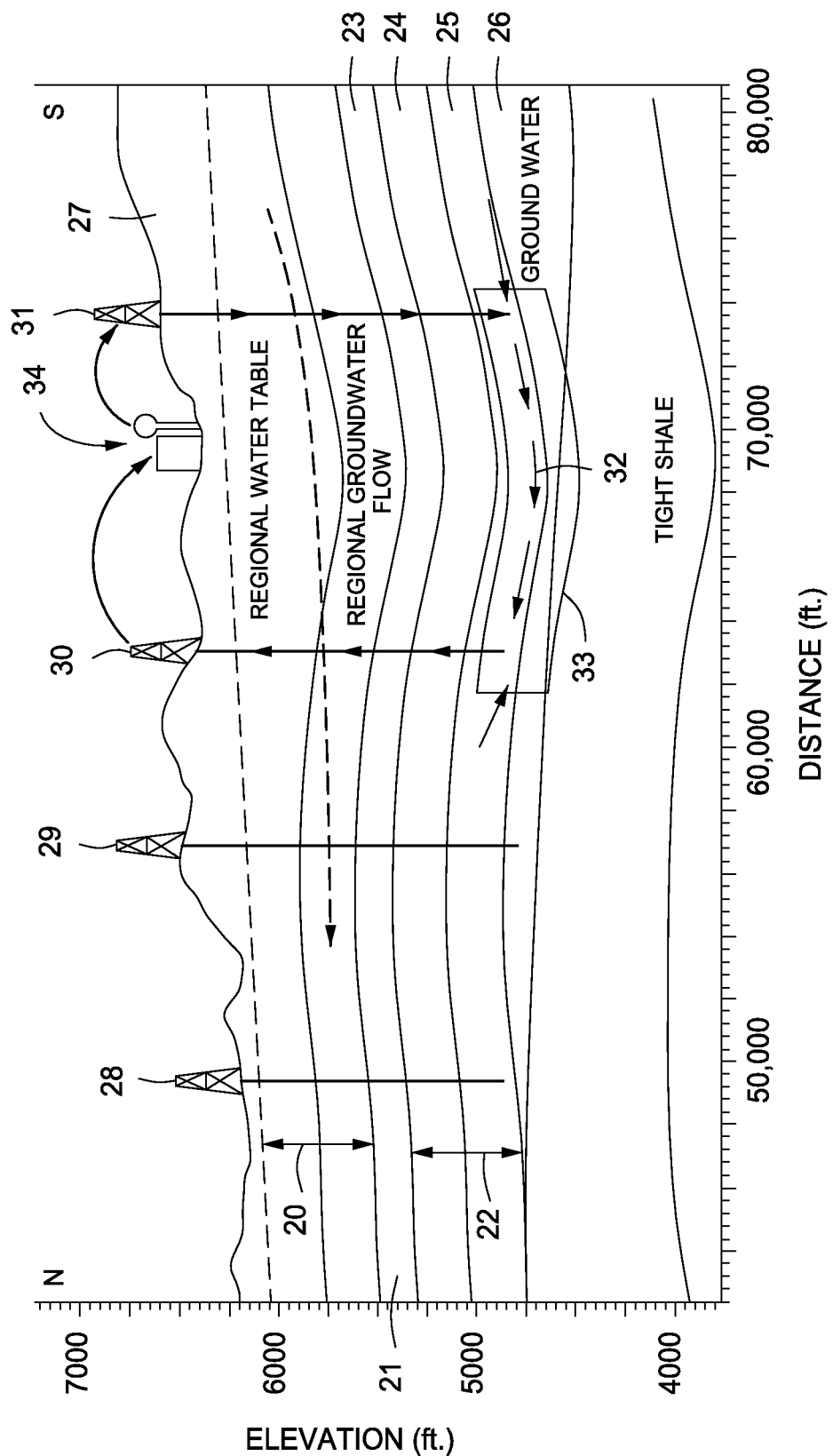
FIG. 3 is cross-sectional side view of an oil shale development indicating ground water flow.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically the water circulation 32 through an oil shale zone 33 that was heated, that resides within or is connected to an aquifer 22, and from which hydrocarbon fluids were previously recovered. Introduction of water via the water injection well 31 forces water into the previously heated oil shale zone 33 so that water-soluble minerals and migratory contaminants species are swept to the water production well 30. The water may then processed in a facility 34 wherein the water-soluble minerals (e.g. nahcolite or soda ash) and the migratory contaminants may be substantially removed from the water stream. Water is then reinjected into the oil shale zone 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water.

It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 m, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. No. 6,880,633 and U.S. Pat. No. 7,032,660. Shell's '660 patent uses subsurface freezing to protect against groundwater flow and groundwater contamination during in situ shale oil production. Additional patents that disclose the use of so-called freeze walls are U.S. Pat. Nos. 3,528,252, 3,943,722, 3,729,965, 4,358,222, 4,607,488, and WO Pat. No. 98996480.

Another example of a physical barrier that may be used to limit fluid flow into or out of an oil shale field is the creation of grout walls. Grout walls are formed by injecting cement into the formation to fill permeable pathways. In the context of an oil shale field, cement would be injected along the periphery of the field. This prevents the movement of pyrolyzed fluids out of the field under development, and the movement of water from adjacent aquifers into the field.

As noted above, several different types of wells may be used in the development of an oil shale field. These may include primarily heater wells and hydrocarbon production wells. However, the wells may also include, for example, injection wells and solution production wells.

The heating of the organic-rich rock formation is accomplished through the use of the heater wells. The heater wells provide a means for heating a portion of a subsurface formation and may include, for example, electrical resistance heating elements, hot fluid circulation, or downhole combustion. The heating elements may be within the wellbore, or may extend away from the wellbore downhole.

In some instances, horizontally completed heater wells may be employed. The Assignee has disclosed a technique of using horizontally completed heater wells in international patent publication WO 2005/010320, cited above. This patent application teaches the use of electrically conductive fractures emanating from the horizontal wellbores to heat an oil shale formation. A heating element is constructed by forming multiple horizontal wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by the horizontally completed wellbores. Electricity may be conducted through the conductive fractures from the heel to the toe of each well. To avoid a short circuit, the horizontal portion of the wellbores adjacent to current flow may be constructed from non-conducting material. The electrical circuit may be completed by an additional horizontal well that intersects one or more of the vertical fractures near the toe to supply the opposite electrical polarity. Alternatively, vertical wells having the opposite polarity may be drilled to intersect the conductive granular material. Lateral heat conduction transfers heat to the oil shale adjacent to the vertical fractures, converting the kerogen to oil and gas.

In order to create fractures in this arrangement, the horizontal wellbores may be oriented perpendicular to the least principle stress within the formation. In the Piceance Basin, this direction is believed to be roughly WNW-ESE.

In an alternate arrangement for heater wells, a plurality of vertical heater wells may be formed, with vertical fractures formed therefrom. In this design, a current may be conducted vertically from the upper to lower portions of the fracture. Horizontal wells may then be drilled to intercept multiple fractures, completing the circuits of several heater wells.

Heater wells may also operate to circulate a heated fluid such as methane gas or naptha through the formation. The heated fluid is circulated through fractures connecting adjacent wellbores of the heater wells. In one aspect, the wellbores are horizontally completed.

The production of hydrocarbon fluids from the heated formation may be accomplished through the use of the production wells. These are wells that are completed or, perhaps, converted for the production of fluids. Pyrolyzed fluids are transported from the formation, into wellbores for the production wells, and upward to the surface. The pyrolyzed fluids are then gathered and processed.

The injection of an aqueous fluid may be accomplished through the use of injection wells. The injection wells may be used to flood the organic-rich rock formation in order to drive other fluids, or may be used to treat the formation in order to change its characteristics. The aqueous solution may be reclaimed or otherwise produced to the surface through the use of the solution production wells.

It is desirable to reduce the number of wells in order to reduce project costs. One method is to use a single well for sequential purposes. Stated another way, wells initially completed for one purpose may be used for another purpose, either at the same time or later after being reworked. This serves to lower project costs and/or decrease the time required to perform certain tasks. For instance, a single wellbore might be completed as a heater well and later converted to a production well. In addition, one or more monitoring wells may be disposed at selected points in the field, with the monitoring wells being configured with one or more devices that measure a temperature, a pressure, and/or a property of a fluid in the wellbore. In some instances, a heater well may also serve as a monitoring well, or may otherwise be instrumented.

In another example, one or more of the production wells may later be used as injection wells for later injecting water into the organic-rich rock formation. Alternatively, one or more of the production wells may later be used as solution production wells for producing an aqueous solution from the organic-rich rock formation. In other aspects, production wells (and, in some circumstances, heater wells) may initially be used as dewatering wells. This might occur before heating is begun and/or when heating is initially started. In addition, in some circumstances dewatering wells can later be used as production wells or, in some circumstances, heater wells. As such, the dewatering wells may be placed and/or designed so that such wells can be later used as production wells and/or heater wells.

In other examples, the heater wells may be placed and/or designed so that they can later be used as dewatering wells, either before heating or after hydrocarbon production. Also, the production wells may be placed and/or designed so that such wells can later be used as dewatering wells and/or heater wells. Similarly, injection wells may be wells that initially were used for other purposes (e.g., heating, production, dewatering, monitoring, etc.), and may later be used for other purposes. Similarly, monitoring wells may be wells that initially were used for other purposes (e.g., heating, production, dewatering, injection, etc.). Such monitoring wells may later be used for other purposes such as water production or formation sweeping.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. Typically, a polygonal pattern will provide a production well proximate to the center of the heater well pattern.

In some instances, the use of a polygonal pattern of heater wells may reduce the number of heater wells actually needed. U.S. Pat. No. 6,913,078, for example, teaches the use of regular patterns of heater wells equidistantly spaced from a production well. The patterns may form equilateral triangular arrays, equilateral hexagonal arrays, or other array patterns. The arrays of heater wells may be disposed such that a distance between each heater well is less than about 70 feet (21 m). The '078 patent issued to Shell Oil Company, and is hereby incorporated by reference.

The well pattern may also be a line drive pattern. A line drive pattern generally includes a first linear array of heater wells, a second linear array of heater wells, and a production well or a line of production wells between the first and second linear arrays of heater wells. However, it is noted that line drive patterns may also be thought of as repeating rectangular patterns of wells. Therefore, such arrays may also be categorized as polygonal patterns.

A linear array of heater wells may be disposed such that a distance between each heater well may be less than about 100 feet, or 50 feet, or 30 feet. A portion of the formation may be heated with heater wells disposed substantially parallel to a boundary of the hydrocarbon formation. Regardless of the arrangement of or distance between the heater wells, in certain embodiments, a ratio of heater wells to production wells disposed within a organic-rich rock formation may be greater than about 5, 8, 10, 20, or more.

In accordance with the present disclosure, another method to reduce the number of heater wells is to use well patterns that are elongated in a particular direction, particularly in the direction of most efficient thermal transfer within the subsurface formation. The determination of most efficient thermal transfer direction and, thus, the elongation direction, may be based upon a variety of factors. These include but are not limited to geological data regarding the formation. For instance, heat convection may be more efficient in the direction perpendicular to the least horizontal principal stress on the formation. In some instances, heat convection may be more efficient in the direction parallel to least horizontal principal stress. In either instance, heater well spacing may be elongated in the direction of most efficient heat convection or other energy transfer mechanism. Elongation may be by a factor of 1.2, 1.5, 2.0, or greater.

Figure 6:
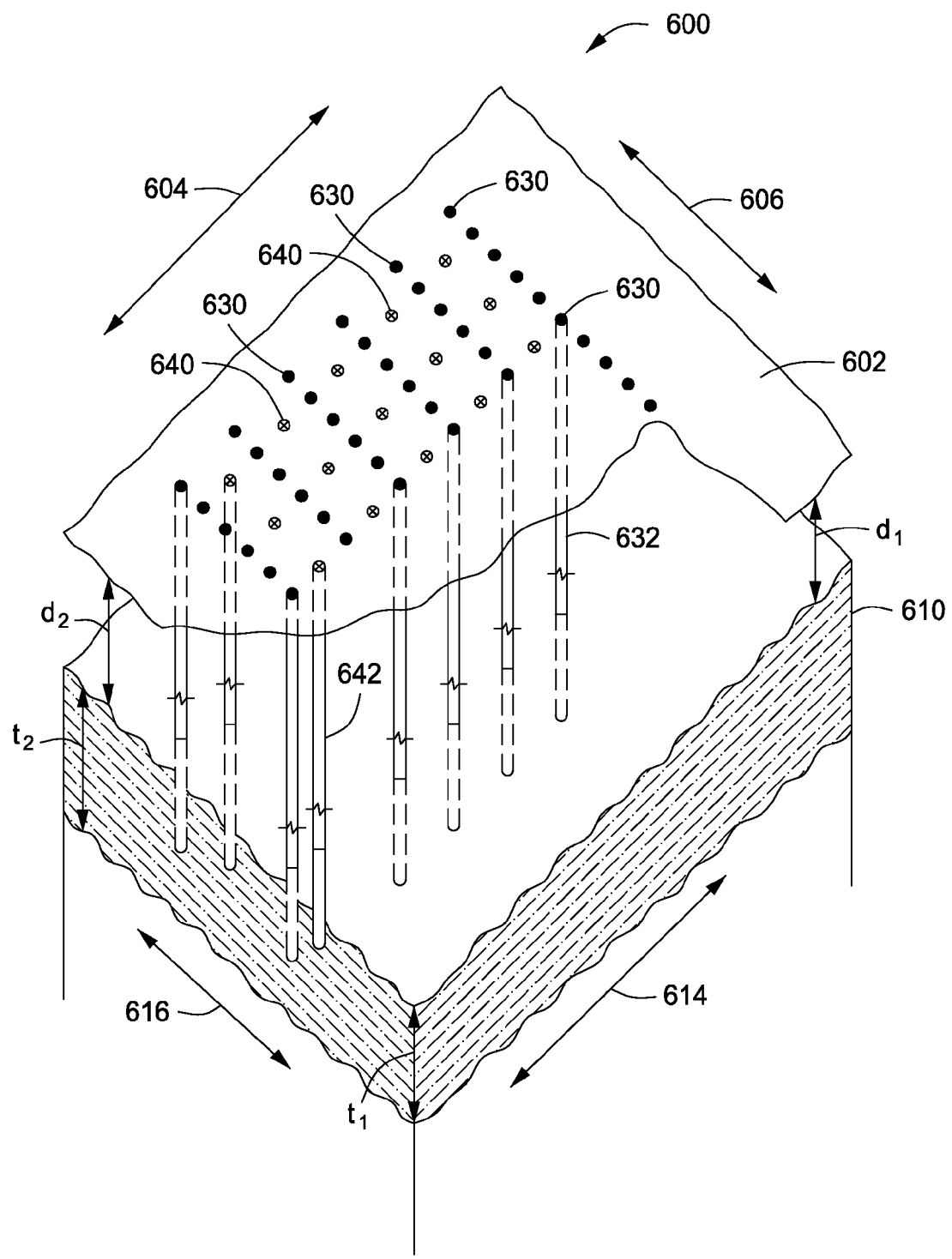
FIG. 6 is an illustration of a portion of a shale oil development area, demonstrating a well spacing arrangement of the present invention, in one embodiment.

FIG. 6 is an illustration of a portion of a hydrocarbon development area 600 demonstrating a well spacing arrangement of the present invention, in one embodiment. The development area 600 represents a surface 602, and a formation 610 below the surface 602. The subsurface formation 610 is an organic rich rock formation, such as oil shale. The development area 600 is for the purpose of developing hydrocarbons from the subsurface oil shale formation 610.

The formation 610 of FIG. 6 has a thickness "t". In some instances, the thickness "t" will vary. It can be seen in the formation 610 that at one point the thickness is at $t_1$. At another point in the formation 610, the thickness increases to $t_2$. For economic reasons, it is preferred that the minimum thickness $t_1$ be at least 50 feet. However, the present inventions are not limited by the thicknesses of the formation 610.

The formation 610 also has a depth "d". In some instances, the depth "d" will vary. At one point, the distance from the surface 602 to the top of the formation 610 is at $d_1$. At another point in the formation 610, the distance from the surface 602 to the top of the formation 610 is at $d_2$. In some embodiments, the oil shale formation 610 targeted for in situ retorting is at a depth greater than 200 feet below the surface. In alternative embodiments, the oil shale formation 610 targeted for in situ retorting is at a depth greater than 500, 1000, or 1500 feet below the surface 602, but typically no deeper than 5,000 feet. In alternative embodiments, the oil shale formation 610 targeted for in situ retorting is at a depth between 500 and 4,000 feet, alternatively between 600 and 3,500 feet, or 700 and 3,000 feet below the surface 602.

The formation 610 of FIG. 6 has a direction in which thermal energy travels most efficiently. Arrow 604 demonstrates the illustrated direction of most efficient travel for thermal energy. Arrow 606 demonstrates a direction essentially normal to direction 604. The direction in which thermal energy travels most efficiently is typically a function of geological features of the targeted formation 610.

The formation 610 has a very limited permeability initially, e.g., less than 5 millidarcies. In order to develop the oil shale formation 610, it is necessary to pyrolyze the solid hydrocarbons in the formation 610. This is done by heating the formation 610 above a pyrolysis temperature for an extended period of time. In order to heat the formation 610 and produce hydrocarbons, a plurality of heater wells 630 are provided. In the illustrative development area 600, the heater wells 630 are arranged in a plurality of rows, or linear arrays. Each heater well 630 has a wellbore 632 extending down to and completed in the formation 610. Each wellbore 632 in the arrangement of FIG. 6 is substantially vertical.

Preferably, the heater wells 630 are designed to provide resistive heat to the formation 610 at a selected temperature. However, other heating methods such as the use of downhole combustible burners may be used. In one aspect, the heated and pyrolyzed oil shale formation 610 will have an average permeability of greater than 10 millidarcies after heating. The heater wells 630 may be located in relatively close proximity, being from 10 feet to up to 300 feet in separation. Alternatively, the wellbores may be spaced from 30 to 200 feet or from 50 to 100 feet.

It is noted that the heater wells 630 are farther apart in the direction of arrow 604, that is, the direction of most efficient thermal energy transfer, as compared to the direction of arrow 606. This means that the heater wells 630 are elongated along the direction in which thermal energy will travel most efficiently through the subsurface formation 610. In one example, the elongation ratio may be about 1.2 to about 2.5. Alternatively, the elongation ratio is about 2.0 to 2.5.

For a repeating pattern of wells where the smallest repeating pattern can be delimited by an isosceles triangle, a parallelogram, or a hexagon with parallel opposite sides, the elongation ratio is the ratio of the length of a longest side to the length of a shortest side. For a repeating pattern of wells where a repeating pattern can be delimited by an isosceles triangle, a parallelogram, or a hexagon with parallel opposite sides where all wells are positioned on the sides of the repeating polygon, the elongation ratio is the ratio of the length of a longest side to the length of a shortest side multiplied by the ratio of the number wells along a shortest side to the number of wells along a longest side.

Interspersed between the lines of heater wells 630 are production wells 640. Each production well 640 has a wellbore 642 extending down to and completed in the formation 610. Each production wellbore 642 in the arrangement of FIG. 6 is also substantially vertical. Pyrolyzed hydrocarbon fluids migrate in the formation 610 to the wellbores 642 of the production wells 640.

As noted, a variety of factors may affect or cause thermal energy to be transferred more efficiently in one direction than in another. One such factor is stresses acting on the formation 610, primarily least horizontal principal stress. These stresses may in turn affect the preferred direction of thermal fracturing upon heating. Thermal fractures can enhance convective heat transfer. The relationship between most efficient thermal transfer direction and the direction of least horizontal principal stress may be based upon experimental studies of the formation. Such may also be based upon prior empirical experience with the formation or similar formations. The relationship may also be established through computer modeling or simulation including, but not limited to, fluid flow simulation or thermal gradient simulation. Various characteristics of the formation 610 may be taken into account in studies or simulations. Such characteristics may include the organic carbon content of the kerogen in the formation 610, the hydrogen index of the formation 610, the initial permeability of the formation 610, the depth of the formation 610, the thickness of the formation 610, the heterogeneity of rock in the formation 610, and modified Fischer Assay analyses.

In connection with the permeability characteristic, it is noted that the process of heating an oil shale formation also changes the permeability of the formation. By heating the oil shale and transforming the kerogen to oil and gas, the permeability is increased through the gradual conversion of kerogen to fluids. Where the conversion rate is faster, i.e., more efficient, in a first direction, then the heater well spacing may be elongated in that first direction relative to a second transverse direction so that the conversion rate within the organic-rich rock is substantially the same.

The heater well spacing 630 may also be described in terms of directional density. Directional density may be functionally defined as the reciprocal distance between a specified well and the nearest neighboring well whose connecting line segment falls within +30° and −30° of the specified direction. In the arrangement 600 of FIG. 6, the heater well spacing 630 has a density that is lower in the determined direction 604 than in the direction 606 normal or transverse to the determined direction 604. This is also demonstrated in the arrangement 700 of FIG. 7 and in the arrangement 800 of FIG. 8, discussed below.

The heating of a portion of a formation such as formation 610 may also cause fracture formation due to temperature differentials with adjacent unheated rock. Thermal fracturing can occur both in the immediate region undergoing heating, and in cooler neighboring regions. The thermal fracturing in the neighboring regions is due to propagation of fractures and tension stresses developed due to rock expansion in the hotter zones. Thermal fracture formation may also be caused by chemical expansion of the transforming kerogen into oil and gas. Thermal fractures increase permeability and aid fluid flow within the formation. The increased flow along fractures will lead to increased heat convection. This again allows heater well spacing to be elongated in the direction of increased heat convection.

Another geological factor that may be used in determining the direction of greatest thermal transfer efficiency is the direction of bedding in the subsurface formation. In this respect, the most efficient thermal transfer direction may be related to the direction of bedding of the formation. For example, in one embodiment the most efficient thermal transfer direction is substantially in the plane of the bedding. The plane of the bedding in FIG. 6 is defined by arrows 604 and 606.

Another factor that may be considered in the determination of most efficient thermal transfer direction is the tilt of the subsurface formation. In certain cases, the direction along which thermal energy will travel through a subsurface formation most efficiently is along a direction of upward tilt of the subsurface formation relative to the surface topography after pyrolysis has been instigated in the formation. Alternatively, the direction along which thermal energy will travel through a subsurface formation most efficiently is along a direction of shortest relative distance between the local plane of the subsurface formation and the local plane of the surface topography. Thus, where a formation is tilted along a particular plane, the heater wells may be elongated in that direction. This is demonstrated in FIG. 7.

Figure 7:
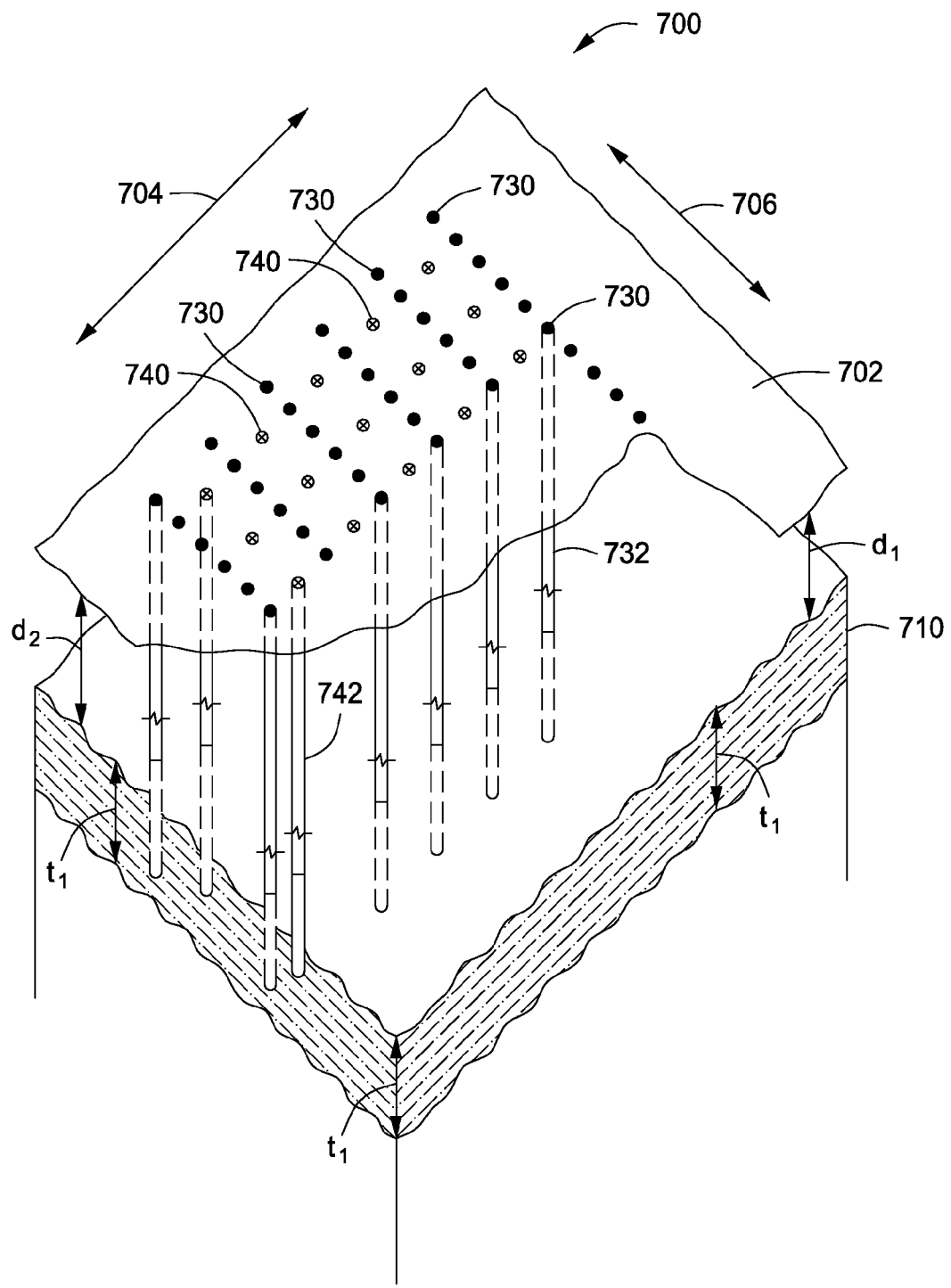
FIG. 7 is another illustration of a portion of a shale oil development area, demonstrating a well spacing arrangement of the present invention, in one embodiment.

FIG. 7 provides another illustration of a portion of a shale oil development area 700, demonstrating a well spacing arrangement of the present invention, in one embodiment. The development area 700 represents a surface 702, and a subsurface formation 710. The formation 710 is again an organic rich rock formation, such as oil shale.

The formation 710 of FIG. 7 has a direction in which thermal energy travels most efficiently. Arrow 704 demonstrates the illustrated direction of most efficient travel for thermal energy. Arrow 706 demonstrates a direction essentially normal to direction 704.

In the area 700 of FIG. 7, heater wells 730 are once again demonstrated. The heater wells 730 are again arranged in linear arrays, with each heater well 730 having a wellbore 732 extending down to and completed in the formation 710. Each wellbore 732 in the arrangement of FIG. 6 is substantially vertical. However, the present inventions are not limited to purely vertical wellbores 732.

It is noted that the heater wells 730 are farther apart in the direction of arrow 704, that is, most efficient thermal energy transfer, as compared to the direction of arrow 706. This means that the heater wells 730 are elongated along the direction in which thermal energy will travel most efficiently through the subsurface formation 710. Once again, the elongation ratio may be about 1.2 to about 2.5.

Between the rows of heater wells 730 are once again production wells 740. Each production well 740 also has a wellbore 742 extending down to and completed in the formation 710. The production wellbores 742 in the arrangement of FIG. 7 are substantially vertical.

The formation 710 of FIG. 7 has a thickness "t". In this arrangement 700, the thickness "t" is essentially constant. Thus, thickness "$t_1$" is shown at several places along the formation 710.

The formation 710 of FIG. 7 is tilted. This means that it is rising beneath the surface 702. In the view of FIG. 7, the formation 710 is tilted in the direction of arrow 704. This is indicated by the depth "d". At one point, a distance from the surface 702 to the top of the formation 710 is at $d_1$. At another point in the formation 710, the distance from the surface 702 to the top of the formation 710 is at $d_2$. Depth $d_2$ is greater than depth $d_1$.

To reflect the tilt in the formation 710 and the corresponding thermal efficiency, the heater wells 732 are spaced farther apart in the direction of arrow 704 as compared to the direction of arrow 706. This means that the heater wells 730 are elongated along the direction in which thermal energy will travel most efficiently through the subsurface formation 710.

It is recognized that in the field, formation depth is typically measured against the surface 702 and not against sea level. Sea level is considered a constant, but the surface level is not. Therefore, in one embodiment of the present inventions, the most efficient thermal transfer direction is along the direction of shortest relative distance between the local plane of the subsurface formation and the local plane of the surface topography. This involves an analysis of the relative spacing of the subsurface formation 710 with the surface 702. In FIG. 7, this relative distance is changing in the direction of the tilt, that is, arrow 704. Alternatively, the direction along which thermal energy will travel through a subsurface formation most efficiently is along a direction of shortest relative distance between the local plane of the subsurface formation and sea level.

FIG. 6 provides a different dynamic. In this respect, the subsurface formation 610 has a changing thickness. Referring back to FIG. 6, it can be seen that the shortest relative distance between the local plane of the subsurface formation 610 and the local plane of the surface topography 602 is at $d_1$. This is in the direction of arrow 604. This is true even though the thickness "t" is increasing in the direction of arrow 606. This may be due to either a tilt in the formation 610, a change in surface topography 602, or both. In any event, the direction of elongation for the heater wells 632 is along arrow 604.

As noted, heater wells in a shale oil development area such as heater wells 630 may be completed substantially vertically. However, heater wells may alternatively be deviated from a vertical axis. Still further, one or more of the heater wells may be completed substantially horizontally, with the horizontal sections being substantially parallel to each other. The horizontal completions may be substantially along the direction of most efficient thermal transfer, which in one embodiment may be perpendicular to the direction of least horizontal principal stress in the formation. In another embodiment, the horizontal completions may be normal to the direction of most efficient thermal transfer, which again may be perpendicular to the direction of least horizontal principal stress.

Figure 8:
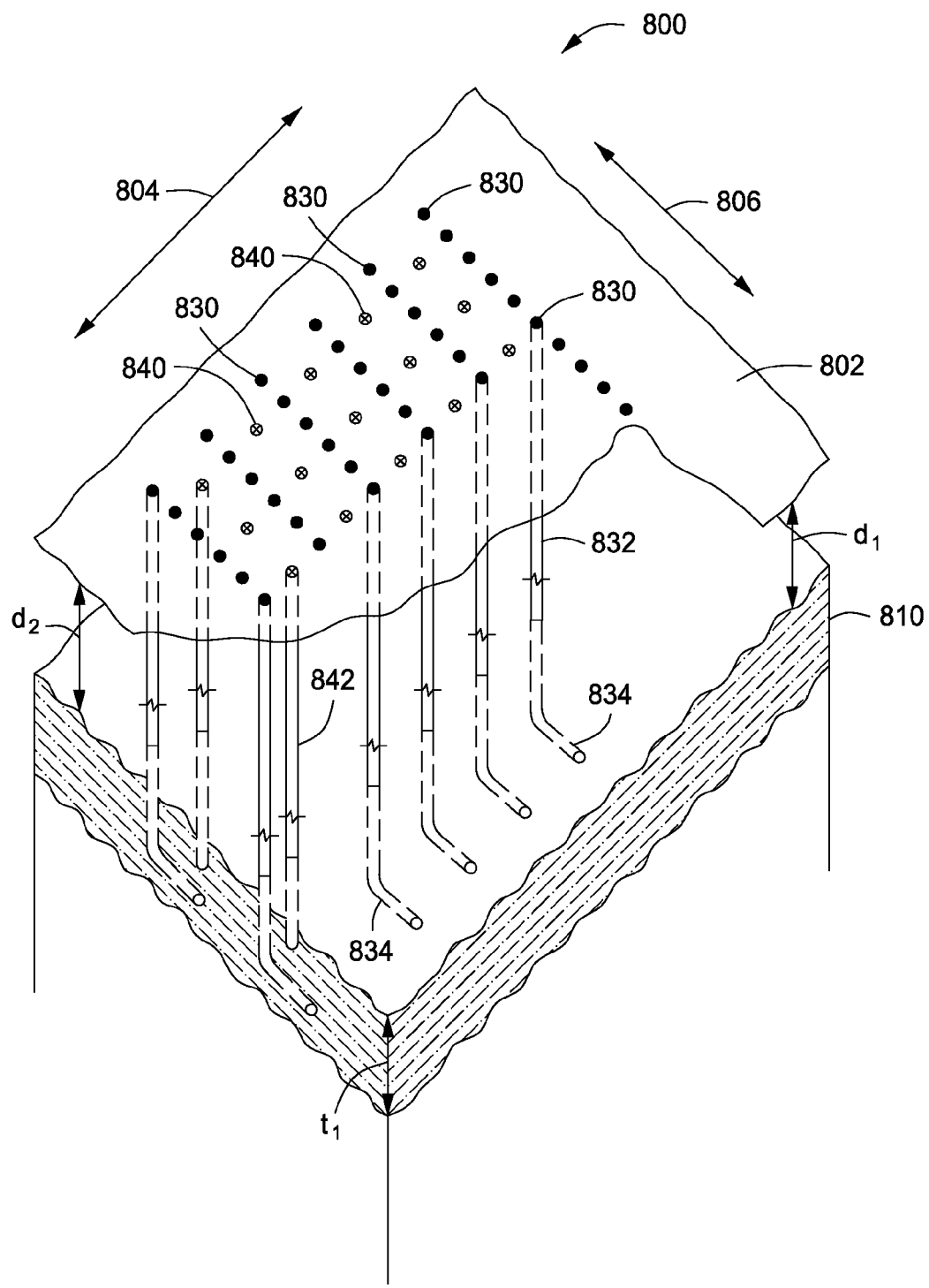
FIG. 8 is another illustration of a portion of a shale oil development area, demonstrating a well spacing arrangement of the present invention, in one embodiment. Here, the heater wells are horizontally completed.

FIG. 8 is an illustration of a portion of a shale oil development area 800, demonstrating a well spacing arrangement and using horizontal completions. The development area 800 represents a surface 802, and a formation 810. The formation 810 is an oil shale formation.

The formation 810 of FIG. 8 has a direction in which thermal energy travels most efficiently. Arrow 804 demonstrates the illustrated direction of most efficient travel for thermal energy. Arrow 806 demonstrates a direction normal to direction 804.

In order to produce hydrocarbons from the formation 810, a plurality of heater wells 830 are once again provided. In the illustrative development area 800, the heater wells 830 are arranged in linear arrays. Each heater well 830 has a wellbore 832 extending down to and completed in the formation 810. However, in this arrangement 800, each wellbore 832 is completed substantially horizontally. A horizontal portion of selected heater wells 830 is shown at 834.

The horizontal wellbores 834 are completed at substantially the same depth within the formation 810. However, in another embodiment (not shown), a first plurality of the horizontal wellbores may be completed at substantially the same first depth, while a second plurality of the horizontal wellbores is completed at a second depth. The completions at the first depth and the completions at the second depth may be alternatingly spaced within the formation 810. They also may be spaced further apart in one direction than another. For example, in one embodiment the horizontal completions 834 may be spaced farther apart horizontally than vertically. The horizontal-to-vertical spacing ratio may be based on a variety of factors. For example, the horizontal-to-vertical spacing ratio may be at least equal to the horizontal-to-vertical heat conductivity of the subsurface formation.

It is noted that the thermal conductivity in oil shales tends to be greater parallel to the bedding orientation than vertically perpendicular to the bedding orientation. Thermal conductivity may be up to 30% greater parallel to the bedding orientation as compared to thermal conductivity perpendicular to the shale layer bedding orientation. Therefore, the horizontal heater wells 830 may be spaced farther apart horizontally than vertically within an oil shale formation. Stated another way, for horizontally completed wells, such wells should be spaced closer together in the vertical direction (perpendicular to bedding) than horizontally (parallel to the plane of the bedding).

In one embodiment, the horizontal-to-vertical spacing ratio may be at least equal to the horizontal-to-vertical thermal conductivity ratio of the bedded oil shale. In one aspect, the horizontal wells are completed in an orientation perpendicular to the shale layers.

In a related embodiment, the horizontal completions 834 may be hydraulically fractured. At depths of greater than 1,000 feet, and depending upon the various stresses at work in the formation 810, it is believed that artificial fractures will form vertically. In one aspect, the one or more artificial fractures form primarily along the direction of least principal stress in the oil shale formation. In one embodiment, the vertical fractures are propped to have a permeability of at least 200 Darcy.

The heater wells 830 are optionally spaced farther apart in the direction of arrow 804 as compared to the direction of arrow 806. This means that the heater wells 832 are elongated along the direction in which thermal energy will travel most efficiently through the subsurface formation 810. However, heat transfer along the direction of the horizontal wells is not as important where horizontal well length is similar to the well spacing.

In FIG. 8, interspersed between the lines of heater wells 832 are production wells 840. Each production well 840 has a wellbore 842 extending down to and completed in the formation 810. Here, each wellbore 842 is substantially vertical. However, the production wells 840 could also be completed horizontally.

In the development areas 600, 700, and 800, the heater wells 630, 730, 830 are spaced linearly. However, in one aspect the plurality of heater wells may comprise sets of well patterns aligned in the direction of most efficient thermal energy travel within the subsurface formation. Each well pattern also may include a production well completed through the formation. The patterns may include, but are not limited to, 3-spot, 5-spot, 6-spot, or 7-spot patterns.

Figure 9:
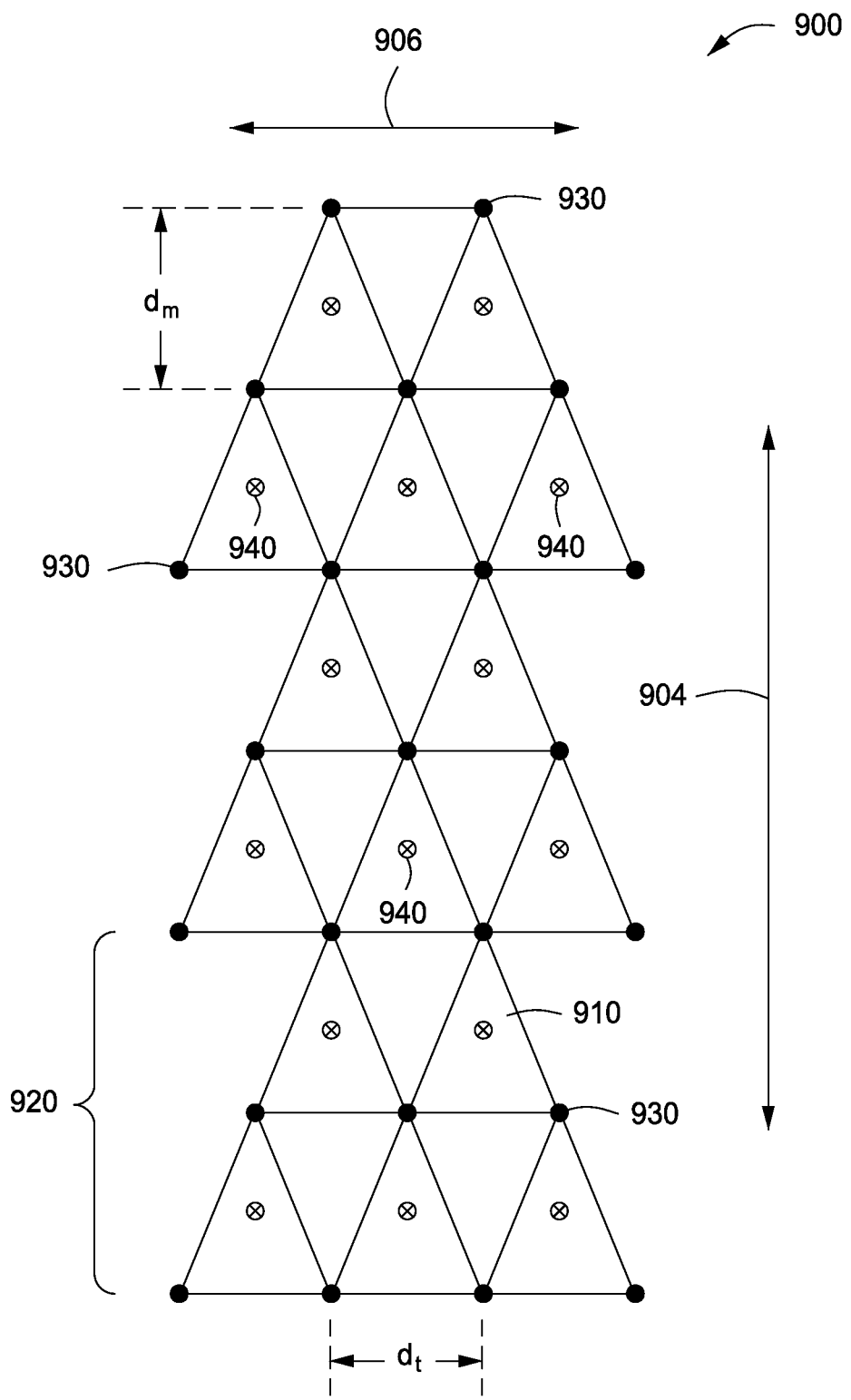
FIG. 9 presents a plan view of an illustrative heater well pattern. The illustrative pattern uses 3-spot patterns.

FIG. 9 presents a plan view of an illustrative heater well pattern 920 in a shale oil development area 900. In this arrangement, a plurality of 3-spot patterns 910 is joined to form a heater well pattern 920. Moreover, multiple heater well patterns 920 are further joined across the shale oil development area 900.

Each 3-spot pattern 910 is comprised of three heater wells 930 and a single production well 940. In the known 3-spot patterns, the triangle formed by the heater well or injection well is equilateral. However, in the 3-spot patterns 910 of FIG. 9, the triangles are elongated.

The development area 900 is for the purpose of producing shale oil from a subsurface formation (such as formation 610 of FIG. 6). The formation has a direction, shown at arrow 904, in which thermal energy travels most efficiently. Arrow 906 is transverse to arrow 904.

The distance between the heater wells 930 in the direction of arrow 904 is indicated by $d_m$. Distance $d_m$ is representative of the spacing between the heater wells 930 in the direction in which thermal energy will travel most efficiently through the subsurface formation. The distance between the heater wells 930 in the direction of arrow 906 is indicated by $d_t$. Direction $d_t$ is representative of the direction that is transverse to the direction in which thermal energy will travel most efficiently through the subsurface formation. It can be seen that distance $d_m$ is greater than distance $d_t$. Thus, the heater well pattern 920 is elongated in the direction of arrow 904.

Within certain of the 3-spot patterns 910 is a production well 940. The production wells 940 receive hydrocarbons that have been converted as a result of the application of heat by the heater wells 930. The production wells 940 convey the hydrocarbons to the surface for processing in surface facilities such as facility 70 of FIG. 4. It is understood that the placement and number of production wells 940 is a matter of designer's choice.

It is also understood that the 3-spot patterns 910 are merely illustrative; any repeating pattern of heater wells 930 may be used for the methods of spacing heater wells herein. The patterns 910 may alternately be 5-spot, 6-spot, 7-spot or other polygonal patterns. The patterns 910 may alternatively be substantially circular. It is also understood that additional heater wells or additional production wells (not shown) may be placed around edges of the development area 900.

The above discussions of heater well arrangements 600, 700, 800 and patterns 920 focus upon the elongation of wells to reflect the direction of most efficient thermal energy conveyance within a targeted subsurface formation. However, the arrangement of heater wells and production wells may also be adjusted to affect the ratio of gas-to-liquids production at surface conditions. As hydrocarbons are generated from the immobile kerogen and begin to flow, the produced hydrocarbons may undergo secondary cracking if they remain for sufficient time in sufficiently hot rock. Generally this is not desirable since a portion of the oil-like liquids will convert to gas (e.g., $C_1$-$C_3$ components) and immobile coke. Gas is typically less valuable than oil, and the formation of coke indicates a loss of hydrocarbons. Secondary cracking is enhanced if a flow pathway of generated hydrocarbons takes it closer to a heater well than its point of origin. Thus, to maximize hydrocarbon liquids production (as compared to gas production), heater wells and production wells are preferably arranged such that the majority of generated hydrocarbons can migrate to a production well by passing only through monotonically decreasing temperatures.

In one embodiment, individual production wells are surrounded by, at most, one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. "Clear pathway" may be functionally defined as a substantially straight pathway between a heater well and a nearest production well which does not pass within one-quarter of the average heater well-to-heater well spacing distance of another heater well. Flow and reservoir simulations may be employed to assess the pathways and temperature history of hydrocarbon fluids generated in situ as they migrate from their points of origin to production wells.

Figure 10:
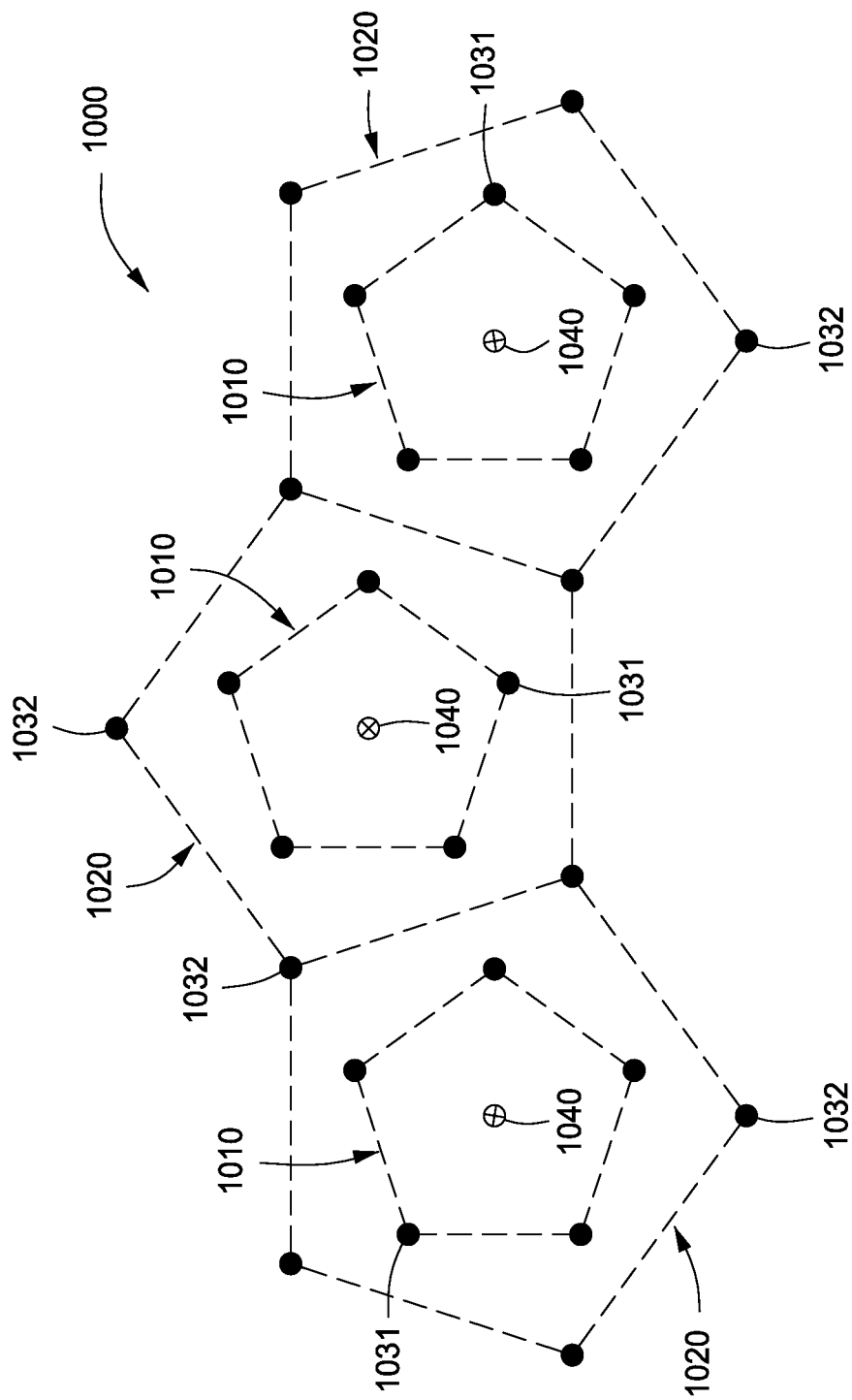
FIG. 10 is a plan view of an illustrative heater well pattern, with a production well within each pattern. Two layers of heater wells are shown. The exemplary patterns are 5-spot patterns.

FIG. 10 provides a plan view of an illustrative heater well arrangement using more than one layer of heater wells. The heater well arrangement is used in connection with the production of hydrocarbons from a shale oil development area 1000. In FIG. 10, the heater well arrangement employs a first layer of heater wells 1010, surrounded by a second layer of heater wells 1020. The heater wells in the first layer 1010 are referenced at 1031, while the heater wells in the second layer 1020 are referenced at 1032.

A production well 1040 is shown central to the well layers 1010 and 1020. It is noted that the heater wells 1032 in the second layer 1020 of wells are offset from the heater wells 1031 in the first layer 1010 of wells, relative to the production well 1040. The purpose is to provide a flowpath for converted hydrocarbons that minimizes travel near a heater well in the first layer 1010 of heater wells. This, in turn, minimizes secondary cracking of hydrocarbons converted from kerogen as hydrocarbons flow from the second layer of wells 1020 to the production wells 1040.

In the illustrative arrangement of FIG. 10, the first layer 1010 and the second layer 1020 each defines a 5-spot pattern. However, it is understood that other patterns may be employed, such as 3-spot or 6-spot patterns. Further, it is understood that the pattern could be repeated and elongated, such as in the direction of most efficient thermal conductivity. In any instance, a plurality of heater wells 1031 comprising a first layer of heater wells 1010 is placed around a production well 1040, with a second plurality of heater wells 1032 comprising a second layer of heater wells 1020 placed around the first layer 1010.

The heater wells in the two layers also may be arranged such that the majority of hydrocarbons generated by heat from each heater well 1032 in the second layer 1020 are able to migrate to a production well 1040 without passing substantially near a heater well 1031 in the first layer 1010. The heater wells 1031, 1032 in the two layers 1010, 1020 further may be arranged such that the majority of hydrocarbons generated by heat from each heater well 1032 in the second layer 1020 are able to migrate to the production well 1040 without passing through a zone of substantially increasing formation temperature.

Well pattern plans such as development areas 900 or 1000 may be combined with simulation specifically to assess flow paths and the impact of secondary cracking Arranging production and heater wells to minimize secondary thermal cracking may require lower ratios of heater-to-production wells. For example, the ratio of heater wells to production wells may include ratios less than about 5:1. In some embodiments, the ratio of heater wells to production wells may be about 4:1, 3:1, 1:1, or less.

Another way of formulating the arrangement of heater wells in a shale oil (or other hydrocarbon) development area is to consider the rate at which the formation is heated downhole. Thus, in one embodiment of the methods for arranging heater wells herein, a plurality of substantially vertical heater wells may be completed through the subsurface formation wherein the heater wells are spaced around a production well such that a heat front emanating from each heater well reaches a production well at substantially the same time. The heater wells may be spaced in a pattern around the production well, including but not limited to, 3-spot, 5-spot, 6-spot, and 7-spot patterns. The pattern may be elongated in a particular direction, as described above, based upon the determined direction of efficient thermal transfer. For example, the 3-spot patterns 910 of FIG. 9 may reflect a point of convergence at the production wells 940 for the heat front.

In connection with the development of an oil shale field, it may be desirable that the progression of heat through the subsurface in accordance with steps 130 and 135 of FIG. 2 be uniform. However, for various reasons the heating and maturation of hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven oil shale maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Therefore, production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

A number of methods for spacing heater wells for an in situ conversion process are provided herein. Generally, one method includes the steps of determining a direction along which thermal energy will travel most efficiently through a subsurface formation, and completing a plurality of heater wells in the subsurface formation. The heater wells are spaced farther apart in the determined direction than in a direction transverse to the determined direction. Preferably, this and other methods are employed when the subsurface formation is an oil shale formation, meaning that it comprises kerogen.

As noted, the step of determining a direction along which thermal energy will travel through the subsurface formation most efficiently may be based upon a review of geological data pertaining to the subsurface formation. Typically, the geological data will include the direction of least horizontal principal stress in the subsurface formation. Usually, the direction along which thermal energy will travel through the subsurface formation most efficiently is substantially perpendicular to the direction of least horizontal principal stress.

In one aspect, the step of heating the subsurface formation forms thermally induced fractures. This increases the permeability of the subsurface formation and aids in the subsurface flow of converted hydrocarbons. The method may further include the steps of completing at least one production well through the subsurface formation, and producing hydrocarbons through the production wells. The production wells may optionally also be aligned in the determined direction.

The methods described above may be aided through computer modeling. In this respect, the step of determining a direction along which thermal energy will travel through the subsurface formation most efficiently may be performed based upon computer modeling of characteristics of the subsurface formation. Again, such characteristics may include the direction of least horizontal principal stress in the subsurface formation. Alternately, or in addition, such characteristics may include the direction of bedding in the subsurface formation. Other characteristics as outlined above may also be included in the computation, such as the tilt of the subsurface formation and surface topography, the organic carbon content of the kerogen, the hydrogen index of the subsurface formation, the initial formation permeability, the depth of the subsurface formation, the thickness of the subsurface formation, and the modified Fischer Assay analyses. Such characteristics may include at least one derived fluid flow simulation and thermal gradient simulation.

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated. One method may include generating heat by burning a fuel external to or within a subsurface formation. For example, heat may be supplied by surface burners or downhole burners or by circulating hot fluids (such as methane gas or naphtha) into the formation through, for example, wellbores via, for example, natural or artificial fractures. Some burners may be configured to perform flameless combustion. Alternatively, some methods may include combusting fuel within the formation such as via a natural distributed combustor, which generally refers to a heater that uses an oxidant to oxidize at least a portion of the carbon in the formation to generate heat, and wherein the oxidation takes place in a vicinity proximate to a wellbore. The present methods are not limited to the heating technique employed unless so stated in the claims.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. Nos. 1,701,884, 3,376,403, 4,626,665, 4,704,514, and 6,023,554).

A review of application of electrical heating methods for heavy oil reservoirs is given by R. Sierra and S. M. Farouq Ali, "*Promising Progress in Field Application of Reservoir Electrical Heating Methods*", Society of Petroleum Engineers Paper 69709, 2001. The entire disclosure of this reference is hereby incorporated by reference.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C. causing artificial maturation.

International patent publication WO 2005/045192 teaches an alternative heating means that employs the circulation of a heated fluid within an oil shale formation. In the process of WO 2005/045192 supercritical heated naphtha may be circulated through fractures in the formation. This means that the oil shale is heated by circulating a dense, hot hydrocarbon vapor through sets of closely-spaced hydraulic fractures. In one aspect, the fractures are horizontally formed and conventionally propped. Fracture temperatures of 320°-400° C. are maintained for up to five to ten years. Vaporized naptha may be the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In certain embodiments of the methods of the present invention, downhole burners may be used to heat a targeted oil shale zone. Downhole burners of various design have been discussed in the patent literature for use in oil shale and other largely solid hydrocarbon deposits. Examples include U.S. Pat. Nos. 2,887,160; 2,847,071; 2,895,555; 3,109,482; 3,225,829; 3,241,615; 3,254,721; 3,127,936; 3,095,031; 5,255,742; and 5,899,269. Downhole burners operate through the transport of a combustible fuel (typically natural gas) and an oxidizer (typically air) to a subsurface position in a wellbore. The fuel and oxidizer react downhole to generate heat. The combustion gases are removed (typically by transport to the surface, but possibly via injection into the formation). Oftentimes, downhole burners utilize pipe-in-pipe arrangements to transport fuel and oxidizer downhole, and then to remove the flue gas back up to the surface. Some downhole burners generate a flame, while others may not.

The use of downhole burners is an alternative to another form of downhole heat generation called steam generation. In downhole steam generation, a combustor in the well is used to boil water placed in the wellbore for injection into the formation. Applications of the downhole heat technology have been described in F. M. Smith, "A Down-hole burner—Versatile tool for well heating," 25$^{th}$ Technical Conference on Petroleum Production, Pennsylvania State University, pp 275-285 (Oct. 19-21, 1966); H. Brandt, W. G. Poynter, and J. D. Hummell, "Stimulating Heavy Oil Reservoirs with Downhole Air-Gas Burners," World Oil, pp. 91-95 (September 1965); and C. I. DePriester and A. J. Pantaleo, "Well Stimulation by Downhole Gas-Air Burner," Journal of Petroleum Technology, pp. 1297-1302 (December 1963).

Downhole burners have advantages over electrical heating methods due to the reduced infrastructure cost. In this respect, there is no need for an expensive electrical power plant and distribution system. Moreover, there is increased thermal efficiency because the energy losses inherently experienced during electrical power generation are avoided.

Few applications of downhole burners exist due to various design issues. Downhole burner design issues include temperature control and metallurgy limitations. In this respect, the flame temperature can overheat the tubular and burner hardware and cause them to fail via melting, thermal stresses, severe loss of tensile strength, or creep. Certain stainless steels, typically with high chromium content, can tolerate temperatures up to ~700° C. for extended periods. (See for example H. E. Boyer and T. L. Gall (eds.), *Metals Handbook*, "Chapter 16: Heat-Resistant Materials", American Society for Metals, (1985.) The existence of flames can cause hot spots within the burner and in the formation surrounding the burner. This is due to radiant heat transfer from the luminous portion of the flame. However, a typical gas flame can produce temperatures up to about 1,650° C. Materials of construction for the burners must be sufficient to withstand the temperatures of these hot spots. The heaters are therefore more expensive than a comparable heater without flames.

For downhole burner applications, heat transfer can occur in one of several ways. These include conduction, convection, and radiative methods. Radiative heat transfer can be particularly strong for an open flame. Additionally, the flue gases can be corrosive due to the $CO_2$ and water content. Use of refractory metals or ceramics can help solve these problems, but typically at a higher cost. Ceramic materials with acceptable strength at temperatures in excess of 900° C. are generally high alumina content ceramics. Other ceramics that may be useful include chrome oxide, zirconia oxide, and magnesium oxide based ceramics. Additionally, depending on the nature of the downhole combustion $NO_x$ generation may be significant.

Heat transfer in a pipe-in-pipe arrangement for a downhole burner can also lead to difficulties. The down going fuel and air will heat exchange with the up going hot flue gases. In a well there is minimal room for a high degree of insulation and hence significant heat transfer is typically expected. This cross heat exchange can lead to higher flame temperatures as the fuel and air become preheated. Additionally, the cross heat exchange can limit the transport of heat downstream of the burner since the hot flue gases may rapidly lose heat energy to the rising cooler flue gases.

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. No. 6,684,644 and U.S. Pat. No. 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 3.

Figure 5:
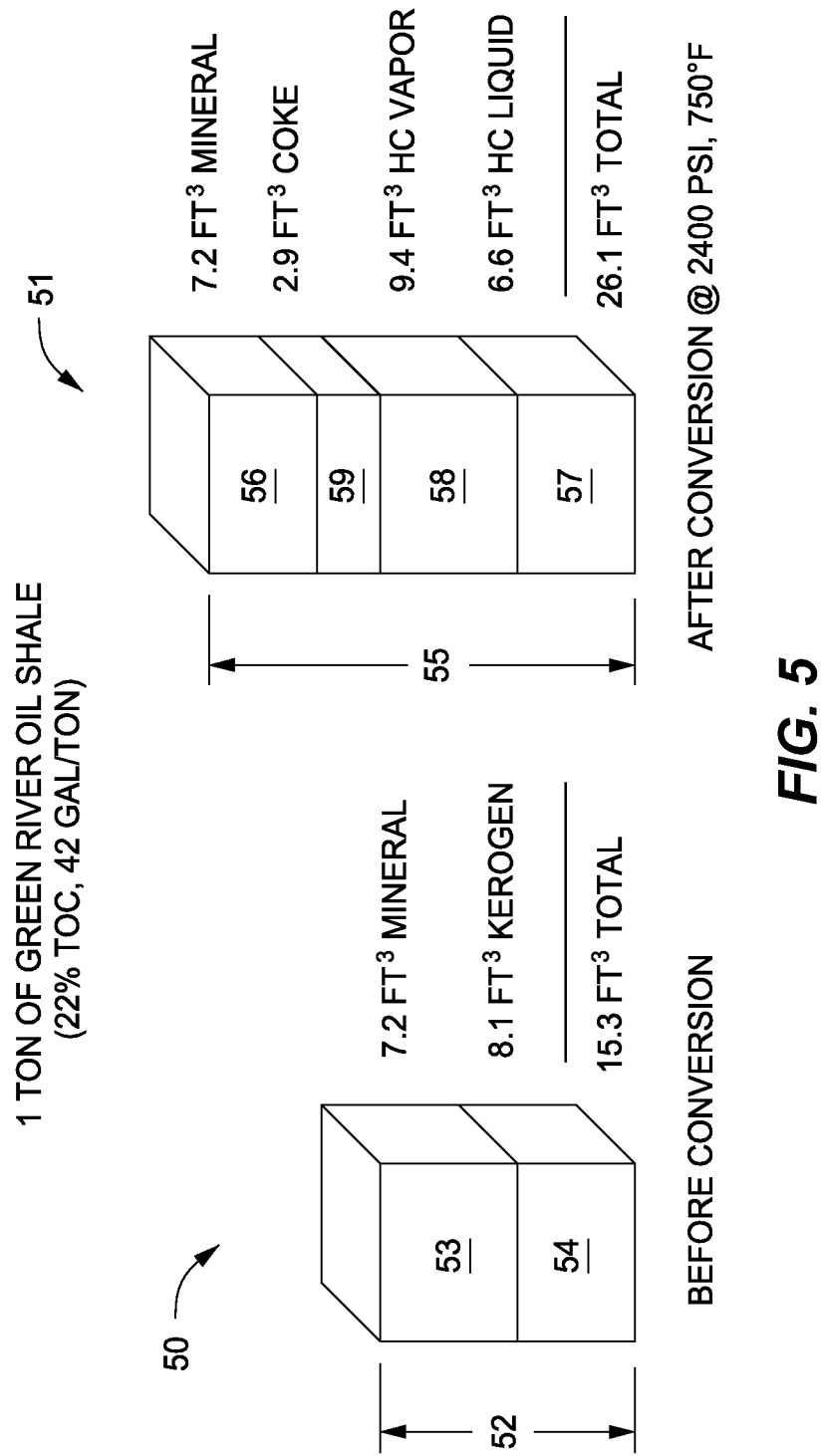
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In addition, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for a heater well. The WO 2005/010320 patent publication incorporated above describes one such method.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite ($NaAl(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, fluorides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional oil shale resources or other hydrocarbon resources may exist at lower depths. Other hydrocarbon resources may include natural gas in low permeability formations (so-called "tight gas") or natural gas trapped in and adsorbed on coal (so called "coal-bed methane"). In some embodiments with multiple shale oil resources it may be advantageous to develop deeper zones first and then sequentially shallower zones. In this way, wells will need not cross hot zones or zones of weakened rock. In other embodiments in may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 4:
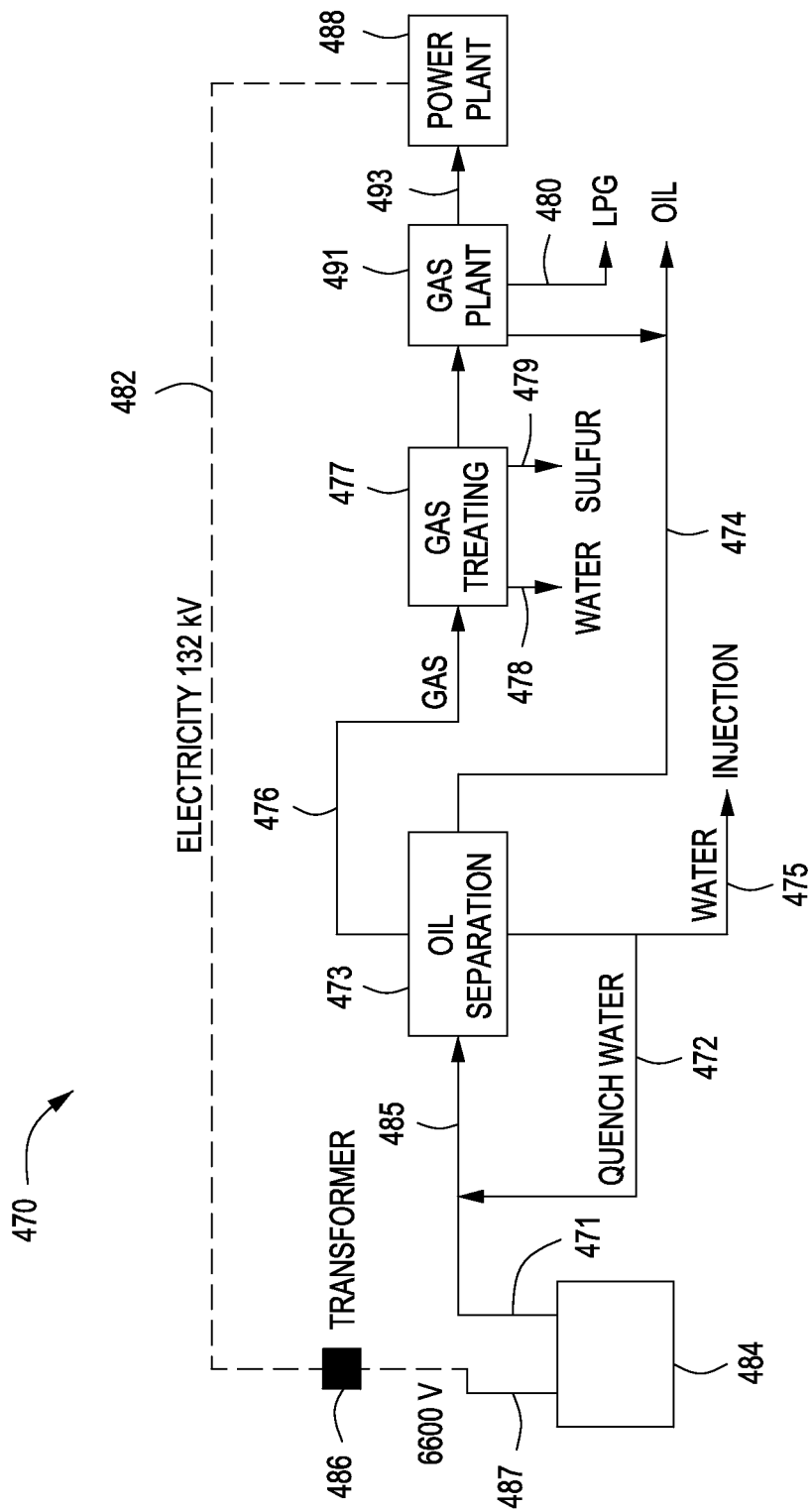
FIG. 4 is a process flow diagram of illustrative surface processing facilities for a subsurface formation development.

FIG. 4 illustrates a schematic diagram of an embodiment of surface facilities 470 that may be configured to treat a produced fluid. The produced fluid 485 may be produced from the subsurface formation 484 though a production well 471 as described herein. The produced fluid may include any of the produced fluids produced by any of the methods as described herein. The subsurface formation 484 may be any subsurface formation, including, for example, an organic-rich rock formation containing any of oil shale, coal, or tar sands for example. A production scheme may involve quenching 472 produced fluids to a temperature below 300° F., 200° F., or even 100° F., separating out condensable components (i.e., oil 474 and water 475) in an oil separator 473, treating the non-condensable components 476 (i.e. gas) in a gas treating unit 477 to remove water 478 and sulfur species 479, removing the heavier components from the gas (e.g., propane and butanes) in a gas plant 481 to form liquid petroleum gas (LPG) 480 for sale, and generating electrical power 482 in a power plant 488 from the remaining gas 483. The electrical power 482 may be used as an energy source for heating the subsurface formation 484 through any of the methods described herein. For example, the electrical power 482 may be fed at a high voltage, for example 132 kV, to a transformer 86 and stepped down to a lower voltage, for example 6600 V, before being fed to an electrical resistance heater element located in a heater well 487 located in the subsurface formation 484. In this way all or a portion of the power required to heat the subsurface formation 484 may be generated from the non-condensable portion of the produced fluids 485. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, CO, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensed hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

CONCLUSION

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for spacing heater wells for an in situ conversion process in a subsurface formation comprising oil shale, the method comprising:
   determining a direction along which thermal energy will travel most efficiently through the subsurface formation based upon a review of geological data pertaining to the subsurface formation; and
   completing a plurality of in situ planar heat sources from heater wells in the subsurface formation, the heater wells being spaced farther apart in the determined direction than in a direction transverse to the determined direction.

2. The method of claim 1, wherein the geological data comprises the direction of least horizontal principal stress in the subsurface formation.

3. The method of claim 2, wherein the direction along which thermal energy will travel through the subsurface formation most efficiently is substantially perpendicular to the direction of least horizontal principal stress.

4. The method of claim 2, wherein the direction along which thermal energy will travel through the subsurface formation most efficiently is substantially parallel to the direction of least horizontal principal stress.

5. The method of claim 1, wherein the geological data comprises the direction of bedding in the subsurface formation.

6. The method of claim 5, wherein the direction along which thermal energy will travel through the subsurface formation most efficiently is substantially along the direction of bedding of the subsurface formation.

7. The method of claim 1, wherein the geological data comprises the tilt of the subsurface formation and the relative spacing with the surface topography.

8. The method of claim 7, wherein the direction along which thermal energy will travel through the subsurface formation most efficiently is along a direction of upward tilt of the subsurface formation relative to the surface topography.

9. The method of claim 7, wherein the direction along which thermal energy will travel through the subsurface formation most efficiently is along a direction of upward tilt of the subsurface formation relative to sea level.

10. The method of claim 7, wherein the direction along which thermal energy will travel through the subsurface formation most efficiently is along a direction of shortest relative distance between the local plane of the subsurface formation and the local plane of the surface topography.

11. The method of claim 7, wherein the direction along which thermal energy will travel through the subsurface formation most efficiently is along a direction of shortest relative distance between the local plane of the subsurface formation and sea level.

12. The method of claim 1, wherein the step of determining a direction along which thermal energy will travel through the subsurface formation most efficiently is performed based upon a review of formation temperature gradient data from previous in situ conversion processes in other areas of the subsurface formation.

13. The method of claim 1, wherein the geological data comprises at least one of the organic carbon content of the kerogen, hydrogen index of the subsurface formation, initial formation permeability, depth of the subsurface formation, thickness of the subsurface formation, heterogeneity of rock in the subsurface formation, and modified Fischer Assay analyses.

14. The method of claim 1, wherein the heater wells are substantially vertical.

15. The method of claim 1, wherein:
   the plurality of heater wells are completed with a substantially horizontal wellbore, the horizontal wellbores being substantially parallel to each other; and
   each horizontal wellbore is completed substantially in the direction of least horizontal principal stress in the subsurface formation.

16. The method of claim 1, wherein:
   the plurality of heater wells are completed with a substantially horizontal wellbore, the horizontal wellbores being substantially parallel to each other; and
   each horizontal wellbore is completed substantially in a direction normal to the least horizontal principal stress in the subsurface formation.

17. The method of claim 1, wherein:
   selected first heater wells have a horizontal wellbore completed at a first depth in the subsurface formation, and selected second heater wells have a horizontal wellbore completed at a second depth in the subsurface formation; and
   the first and second heater wells are alternatingly spaced within the subsurface formation, and are spaced farther apart horizontally than vertically.

18. The method of claim 1, further comprising:
   heating the subsurface formation in order to form thermally induced fractures.

19. The method of claim 1, further comprising the steps of:
   completing at least one production well through the subsurface formation;
   producing hydrocarbons through the at least one production well; and
   wherein the at least one production well comprises a plurality of production wells also aligned in the determined direction.

20. The method of claim 1, wherein:
   the plurality of heater wells comprise sets of a repeating well pattern elongated in the determined direction;
   each set of repeating well patterns has a production well completed through the surface formation; and
   the sets of well patterns each have a production well completed through the surface formation.

21. The method of claim 20, wherein the patterns of heater wells comprise a first pattern around a corresponding production well, and a second pattern around the first pattern.

22. The method of claim 20, wherein the repeating well pattern elongated in the determined direction defines an elongation ratio of about 1.20 to 2.50.

23. The method of claim 20, wherein the patterns of heater wells are 3-spot patterns, 5-spot patterns, 6-spot patterns or 7-spot patterns.

24. The method of claim 20, wherein the patterns of heater wells comprise a first pattern around a corresponding production well, and a second pattern around the first pattern.

25. The method of claim 1, wherein the in situ planar heat sources comprise electrically conductive fractures or heated fluid through fractures in the subsurface formation.

26. A method for arranging heater wells for an in situ kerogen conversion process, comprising:

providing a production well;

completing a plurality of heater wells around the production well, the plurality of heater wells comprising a first layer of heater wells around the production well, and a second layer of heater wells around the first layer;

wherein the heater wells in the second layer of wells are arranged relative to the heater wells in the first layer of wells so as to minimize secondary cracking of hydrocarbons converted from the kerogen as the hydrocarbons flow from the second layer of wells to the production well; and wherein the plurality of heater wells and the production well are arranged such that the majority of hydrocarbons generated by heat from each heater well is able to migrate to the production well without passing through a zone of substantially increasing formation temperature.

27. The method of claim 26, further comprising:

heating the subsurface formation in order to form thermally induced fractures.

28. The method of claim 27, further comprising:

completing at least one production well through the subsurface formation; and producing hydrocarbons through the at least one production well.

29. The method of claim 26, wherein:

the plurality of heater wells comprise sets of a repeating well pattern;

each set of repeating well patterns has a production well completed through the surface formation; and the sets of well patterns each have a production well completed through the surface formation.

30. A method for spacing heater wells for an in situ conversion process in a subsurface formation comprising oil shale, the method comprising:

determining a direction along which thermal energy will travel most efficiently through the subsurface formation based upon a review of geological data pertaining to the subsurface formation, wherein the geological data comprises at least one of the group consisting of direction of least horizontal principal stress in the subsurface formation, the direction of bedding in the subsurface formation, the tilt of the subsurface formation, and the relative spacing with the surface topography;

completing a plurality heater wells in the subsurface formation, the heater wells being spaced farther apart in the determined direction than in a direction transverse to the determined direction;

wherein selected first heater wells have a horizontal wellbore completed at a first depth in the subsurface formation, and selected second heater wells have a horizontal wellbore completed at a second depth in the subsurface formation; and the first and second heater wells are alternatingly spaced within the subsurface formation, and are spaced farther apart horizontally than vertically.

31. The method of claim 30, wherein the direction along which thermal energy will travel through the subsurface formation most efficiently is substantially perpendicular to the direction of least horizontal principal stress.

32. The method of claim 30, wherein the direction along which thermal energy will travel through the subsurface formation most efficiently is substantially parallel to the direction of least horizontal principal stress.

33. The method of claim 30, wherein determining the direction along which thermal energy will travel through the subsurface formation most efficiently includes reviewing formation temperature gradient data from previous in situ conversion processes in other areas of the subsurface formation.

* * * * *